United States Patent
Yoshikawa et al.

(10) Patent No.: US 9,806,576 B2
(45) Date of Patent: Oct. 31, 2017

(54) ARMATURE, ARMATURE MANUFACTURING METHOD, AND ROTATING ELECTRICAL DEVICE

(71) Applicant: ASMO CO., LTD., Kosai, Shizuoka-pref. (JP)

(72) Inventors: Tetsuji Yoshikawa, Hamamatsu (JP); Akihiko Seki, Toyokawa (JP)

(73) Assignee: ASMO CO., LTD., Kosai (JP)

( * ) Notice: Subject to any disclaimer, the term of this patent is extended or adjusted under 35 U.S.C. 154(b) by 350 days.

(21) Appl. No.: 14/492,075

(22) Filed: Sep. 22, 2014

(65) Prior Publication Data

US 2015/0091409 A1    Apr. 2, 2015

(30) Foreign Application Priority Data

Sep. 30, 2013  (JP) .................................. 2013-205090
May 16, 2014  (JP) .................................. 2014-102551

(51) Int. Cl.
*H02K 3/34*    (2006.01)
*H02K 1/16*    (2006.01)
(Continued)

(52) U.S. Cl.
CPC ............. *H02K 3/345* (2013.01); *H02K 1/148* (2013.01); *H02K 1/165* (2013.01); *H02K 3/522* (2013.01);
(Continued)

(58) Field of Classification Search
CPC ........ H02K 1/148; H02K 1/165; H02K 3/345; H02K 3/522; H02K 15/08; H02K 15/095
See application file for complete search history.

(56) References Cited

U.S. PATENT DOCUMENTS

| 7,560,839 B2 * | 7/2009 | Sumiya ................ F02M 37/048 |
| | | 310/43 |
| 2012/0098381 A1 * | 4/2012 | Seki ........................ H02K 1/148 |
| | | 310/215 |

(Continued)

FOREIGN PATENT DOCUMENTS

| EP | 1499000 A1 | 1/2005 |
| JP | 2013-90420 A | 5/2013 |

(Continued)

*Primary Examiner* — Dang Le
(74) *Attorney, Agent, or Firm* — SOLARIS Intellectual Property Group, PLLC

(57) ABSTRACT

An armature includes plural core configuration members and plural insulators integrated with the core configuration members, each insulator including a coupling portion that couples a pair of insulation portions. The armature includes plural coil wires, each including a pair of wound portions wound onto respective core configuration members, and a crossing wire connecting the pair of wound portions. Plural armature configuration units are configured independently by integrating a pair of the core configuration members with each insulator and winding the coil wire onto the pair of core configuration members. Plural armature configuration sections are configured by combining two armature configuration units adjacent in the circumferential direction. In each armature configuration section, the coupling portion and the crossing wire of one armature configuration unit are side by side with the coupling portion and crossing wire of the other armature configuration units along a direction orthogonal to an axial direction of the armature configuration section.

20 Claims, 31 Drawing Sheets

(51) Int. Cl.
    *H02K 15/08* (2006.01)
    *H02K 1/14* (2006.01)
    *H02K 3/52* (2006.01)
    *H02K 15/095* (2006.01)

(52) U.S. Cl.
    CPC ........... *H02K 15/08* (2013.01); *H02K 15/095* (2013.01); *H02K 2203/06* (2013.01); *Y10T 29/49009* (2015.01)

(56) References Cited

U.S. PATENT DOCUMENTS

| | | | |
|---|---|---|---|
| 2013/0162098 A1* | 6/2013 | Furuhashi | H02K 3/38 |
| | | | 310/215 |
| 2013/0187513 A1 | 7/2013 | Hashimoto et al. | |
| 2013/0200742 A1* | 8/2013 | Seki | H02K 3/28 |
| | | | 310/195 |
| 2015/0091409 A1* | 4/2015 | Yoshikawa | H02K 3/345 |
| | | | 310/215 |

FOREIGN PATENT DOCUMENTS

| | | |
|---|---|---|
| JP | 2013-153590 A | 8/2013 |
| JP | 2013-153591 A | 8/2013 |
| WO | 2013/111803 A1 | 8/2013 |

* cited by examiner

ARMATURE, ARMATURE MANUFACTURING METHOD, AND ROTATING ELECTRICAL DEVICE

CROSS-REFERENCE TO RELATED APPLICATION

This application claims priority under 35 USC 119 from Japanese Patent Applications, No. 2013-205090 filed Sep. 30, 2013, and No. 2014-102551 filed May 16, 2014, the disclosures of which are incorporated by reference herein.

BACKGROUND OF THE INVENTION

Technical Field

The present invention relates to an armature, a manufacturing method of an armature, and a rotating electrical device.

Related Art

An example of a conventional armature with a divided core is disclosed in Japanese Patent Application Laid-Open (JP-A) No. 2013-132122. The armature includes a divided core divided into six core configuration members (core elements), three insulators, and plural coil wires that form a U phase, a V phase, and a W phase.

In this armature, three armature configuration sections (stator elements) are configured independently of each other by assembling a pair of the core configuration members to each of the insulators, and winding each of the coil wires onto the pair of the core configuration members with the insulator interposed between the core configuration members and the coil wire.

Each of the armature configuration sections is provided with a crossing wire that connects together wound portions of the coil wire, and crossing wire that connects a terminal end portion of the coil wire and the wound portion, with the pair of crossing wires intersecting with each other (overlapping in an axial direction of the armature at appropriate locations).

Technical Problem

However, in the above armature, a pair of crossing wires intersects with each other in each of the armature configuration sections, and so a thickness is formed equivalent to six of the crossing wires when the plural armature configuration sections are assembled together, increasing the axial length of the armature.

The present invention is to provide an armature enabling a shorter axial length.

SUMMARY

In order to achieve the above object, an armature of a first aspect of the present invention includes plural core configuration members that configure an armature core and that are divided in a circumferential direction of the armature core, plural insulators that each include a pair of insulation portions integrated with the core configuration members, and a coupling portion that couples the pair of insulation portions together, and plural coil wires that each include a pair of wound portions that have been wound onto the respective core configuration members with the insulation portions interposed between the core configuration members and the wound portions, and a crossing wire that connects together the pair of wound portions. Wherein, plural armature configuration units are configured independently of each other by integrating a pair of the core configuration members with each of the plural insulators and winding the respective coil wire onto the pair of core configuration members, the plural armature configuration units configure plural armature configuration sections by combining two of the armature configuration units that are adjacent in the circumferential direction, and in each of the plural armature configuration sections, the coupling portion of the insulator and the crossing wire of one of the armature configuration units are arranged side by side with the coupling portion of the insulator and the crossing wire of the other of the armature configuration units along a direction orthogonal to an axial direction of the armature configuration section.

According to this armature, the plural armature configuration units are configured independently of each other by integrating a pair of the core configuration members with each of the plural insulators and winding the respective coil wire onto the pair of core configuration members. The plural armature configuration units configure the plural armature configuration sections by combining two of the armature configuration units that are adjacent in the circumferential direction. In each of the plural armature configuration sections, the coupling portion of the insulator and the crossing wire of one of the armature configuration units are arranged side by side with the coupling portion of the insulator and the crossing wire of the other of the armature configuration units along a direction orthogonal to the axial direction of the armature configuration section. Since the pair of crossing wires do not intersect with each other in the respective armature configuration sections, an increase in the axial length of the armature can be suppressed even when the plural armature configuration sections are assembled together to form the armature. A shorter axial length of the armature is accordingly enabled than when the pairs of crossing wires intersect with each other in the respective armature configuration sections.

An armature of a second aspect of the present invention is the armature of the first aspect, wherein the coupling portion is formed from an insulating material, and the insulation portion and the coupling portion are integrally formed.

According to this armature, the insulation portion and the coupling portion are integrally formed, thereby enabling a reduction in the number of components.

An armature of a third aspect of the present invention is the armature of either the first aspect or the second aspect, wherein in each of the plural armature configuration sections, the coupling portion and the crossing wire of the one of the armature configuration units and the coupling portion and the crossing wire of the other of the armature configuration units are provided separately on one side and the other side with respect to an axial center of the armature configuration section.

According to this armature, in each of the plural armature configuration sections, one of the coupling portions and one of the crossing wires, and the other of the coupling portions and the other of the crossing wires, are provided separately on one side and the other side with respect to the axial center of the armature configuration section. The center of gravity can accordingly be suppressed from becoming unbalanced toward one side in the respective armature configuration sections.

An armature of a fourth aspect of the present invention is the armature of the third aspect, wherein in each of the armature configuration sections, pairs of the insulators of two of the combined armature configuration units are disposed symmetrically about a plane.

According to this armature, in each of the armature configuration sections, pairs of the insulators of two of the combined armature configuration units are disposed symmetrically about a plane. Design and manufacture of the insulators is accordingly straightforward, and good balance is enabled when the pairs of insulators (the pairs of armature configuration units) are combined together.

An armature of a fifth aspect of the present invention is the armature of any one of the first aspect to the fourth aspect, wherein in each of the armature configuration units, a pair of the core configuration members are disposed such that a gap equivalent to a length of at least one core configuration member in the circumferential direction of the armature core is left between the respective core configuration members.

According to this armature, in each of the armature configuration units, a pair of the core configuration members are disposed so as to leave a gap equivalent to a length of at least one core configuration member in the circumferential direction of the armature core between the respective core configuration members. Space can accordingly be secured at the periphery of the core configuration members, thereby enabling a winding machine to be suppressed from impinging on other core configuration member when using the winding machine to wind the coil wires onto one of the core configuration members in each of the armature configuration units. Work efficiency during coil winding can accordingly be improved.

An armature of a sixth aspect of the present invention is the armature of any one of the first aspect to the fifth aspect, wherein an engaging portion and an engaged portion are provided at each of the plural core configuration members, and the plural core configuration members are coupled together in a ring shape by engagement of the adjacent engaging portions and engaged portions in the circumferential direction of the armature core.

According to this armature, the engaging portion and the engaged portion are provided at each of the plural core configuration members, and the plural core configuration members are coupled together in a ring shape by engagement of the circumferential direction adjacent engaging portions and engaged portions. Rattling of the plural core configuration members that are coupled together in a ring shape can accordingly be suppressed due to the adjacent engaging portions and engaged portions.

An armature of a seventh aspect of the present invention is the armature of the sixth aspect, wherein a guide projection is provided to a portion of the insulator connecting between the insulation portion and the coupling portion, and an end portion of the crossing wire is positioned between the engaging portion and the engaged portion formed at both sides of the core configuration member by being guided by the guide projection.

According to this armature, the guide projection is provided to a portion of the insulator connecting between the insulation portion and the coupling portion, and the end portion of the crossing wire is positioned between the engaging portion and the engaged portion formed at both sides of the core configuration member by being guided by the guide projection. The crossing wire can accordingly be suppressed from becoming caught between adjacent engaging portions and engaged portions in the circumferential direction, even during engagement of the circumferential direction adjacent engaging portions and engaged portions to couple together the adjacent core configuration members in the circumferential direction.

An armature of an eighth aspect of the present invention is the armature of the seventh aspect, wherein the crossing wires pass further to the inside than inner radial portions of the plural core configuration members.

According to this armature, the crossing wires pass further to the inside than inner radial portions of the plural core configuration members. This once again enables the crossing wires to be suppressed from becoming caught between the circumferential direction adjacent engaging portion and engaged portion, even during engagement of the engaging portions and engaged portions to couple together the adjacent core configuration members.

An armature of a ninth aspect of the present invention is the armature of any one of the first aspect to the eighth aspect, wherein in each of the armature configuration sections, a pair of the coupling portions of two of the combined armature configuration units forms a ring shape.

According to this armature, in each of the armature configuration sections, the pair of the coupling portions form a ring shape. Rattling of the pair of coupling portions can accordingly be suppressed, thereby enabling the crossing wires following the coupling portions to be stably retained.

An armature of a tenth aspect of the present invention is the armature of any one of the first aspect to the ninth aspect, wherein the coupling portions are formed in circular arc shapes along inner radial portions of the plural core configuration members.

According to this armature, the coupling portions are formed in circular arc shapes along the inner radial portions of the plural core configuration members. The circular arc shaped coupling portions enable the crossing wires to be smoothly laid out from one to the other of the core configuration members in each of the pair of core configuration members.

An armature of a eleventh aspect of the present invention is the armature of any one of the first aspect to the tenth aspect, wherein the coupling portions each includes a guide portion that supports the crossing wire from the radial direction inside of the coupling portion, and a restriction portion that restricts movement of the crossing wire in the axial direction of the armature.

According to this armature, the coupling portions each include the guide portion that supports the crossing wire from the radial direction inside of the coupling portion, and the restriction portion that restricts movement of the crossing wire in the axial direction of the armature. Deformation of the crossing wire toward the radial direction inside and in the axial direction of the armature can accordingly be suppressed. The crossing wire following the coupling portion can therefore be retained even more stably.

Note that in the armature, the wound portions of each of the armature configuration units may be wound in a tightening direction.

According to this armature, the wound portions of each of the armature configuration units have been wound in the tightening direction. Loosening of the wound portions can accordingly be suppressed, and intensive winding of the wound portions is enabled.

An armature of a twelfth aspect of the present invention is the armature of any one of the first aspect to the eleventh aspect, wherein the plural armature configuration sections are assembled together along the axial direction of the armature, and the crossing wire in the armature configuration section of an intermediate layer is disposed between the coupling portions of the armature configuration sections of an upper layer and a lower layer of the plural armature configuration sections.

According to this armature, the crossing wire in the armature configuration section of the intermediate layer is disposed between the coupling portions of the armature configuration sections of the upper layer and the lower layer. The crossing wire of the intermediate layer can accordingly be interposed between the coupling portions of the armature configuration sections of the upper layer and the lower layer, thereby enabling the crossing wire of the intermediate layer from lifting up.

An armature of a thirteenth aspect of the present invention is the armature of any one of the first aspect to the twelfth aspect, wherein the coupling portions of at least the armature configuration section disposed in the lowermost layer are disposed at the inside of the plural wound portions arrayed in a ring shape, and within a height of the plural wound portions in the axial direction of the armature.

According to this armature, the coupling portions of at least the armature configuration section disposed in the lowermost layer out of the plural armature configuration sections are disposed within a height of the plural wound portions in the axial direction of the armature. Moreover, the coupling portions of at least the armature configuration section in the lowermost layer are disposed at a position lower than the end portions (coil ends) positioned at end side in the axial direction of the armature out of the plural wound portions. The projection amount of the plural coupling portions in the armature axial direction can accordingly be suppressed, thereby enabling a shorter axial length of the armature.

Note that terminal end portions of coil wires of the same phase out of the plural coil wires may be disposed within the same slot out of plural slots formed between the plural core configuration members.

According to this armature, the terminal end portions of the coil wires of the same phase out of the plural coil wires may be disposed within the same slot out of the plural slots formed between the plural core configuration members, thereby enabling the terminal end portions of coil wires of the same phase to be connected together easily.

An armature of a fourteenth aspect of the present invention is the armature of any one of the first aspect to the thirteenth aspect, wherein terminal end portions of the plural coil wires are disposed at a side opposite, in the axial direction of the plural armature configuration sections, to a coupling portion side.

According to this armature, the terminal end portions of the plural coil wires are disposed at the side opposite, in the axial direction of the plural armature configuration sections, to the coupling portion side, such that counterpart members for connecting to the terminal end portions of the plural coil wires and the coupling portions are disposed on mutually opposite sides to each other. The axial length of the armature can accordingly be made shorter compared to a case in which, for example, counterpart members are disposed on the same side as the coupling portions.

Note that as in a fifteenth aspect, configuration is more preferably the armature of any one of the first aspect to the thirteenth aspect including twelve of the core configuration members, six of the insulators, and the plural coil wires configuring a U phase, a V phase and a W phase. Wherein, six of the armature configuration units are configured independently of each other by integrating a pair of the core configuration members with each of the six insulators and winding the respective coil wire onto the pair of core configuration members, and the six armature configuration units configure three of the armature configuration sections by combining two of the respective armature configuration units adjacent in the circumferential direction of the armature core.

Moreover, in a sixteenth aspect, a rotating electrical device including the armature of any one of the first aspect to the fourteenth aspect is preferable due to enabling a shorter axial length of the overall rotating electrical device.

An armature manufacturing method of a seventeenth aspect of the present invention is a manufacturing method of the armature of any one of the first aspect to the fifteenth aspect, including an armature configuration unit assembly process in which the mutually independent plural armature configuration units are each assembled by integrating a pair of the core configuration members with each of the plural insulators, and winding the respective coil wire onto the pair of core configuration members, an armature configuration section assembly process in which two adjacent armature configuration units in the circumferential direction of the armature core out of the plural armature configuration units are combined to assemble the plural armature configuration sections, and an armature assembly process in which the plural armature configuration sections are assembled together to form the armature.

According to this armature manufacturing method, the coil wires are wound onto the pair of core configuration members in a separated state of the plural mutually independent armature configuration units, thereby enabling space to be secured at the periphery of the core configuration members when using a winding machine to wind the coil wires onto the core configuration members. The winding machine can accordingly be suppressed from impinging on other core configuration members when winding the coil wires onto one of the core configuration members in the respective armature configuration units, enabling an improvement in work efficiency during coil winding.

An armature manufacturing method of a eighteenth aspect of the present invention is the armature manufacturing method of the seventeenth aspect, wherein in the armature configuration unit assembly process, a molded member is employed that integrally includes a pair of the insulators adjacent in the circumferential direction of the armature core out of the plural insulators, and a connector portion that connects the pair of insulators, and the pair of core configuration members are integrated with the insulators, and the respective coil wire is wound onto the pair of core configuration members, in a connected state of the pair of insulators by the connector portion, and in the armature configuration section assembly process, the armature configuration units adjacent to each other in the circumferential direction of the armature core are combined in a state in which the connector portion has been removed.

According to this armature manufacturing method, employing the molded member that integrally includes a pair of the insulators and the connector portion that connects the pair of insulators, enables a reduction in the number of components and the number of processes during manufacture of the armature.

Note that configuration may be made such that in the armature configuration section assembly process and the armature assembly process, the circumferential direction adjacent engaging portions and engaged portions are fitted together with play therebetween, and after the armature assembly process, there is a press-fit process in which a press-fit member is press-fitted inside the armature core configured by the plural core configuration members coupled together in a ring shape, to give a state in which the armature core is spread out toward the radial direction outside.

According to this manufacturing method, in the armature configuration section assembly process and the armature assembly process, the circumferential direction adjacent engaging portions and engaged portions are fitted together with play therebetween, enabling easy coupling between the circumferential direction adjacent armature configuration units and easy coupling between adjacent armature configuration sections. The press-fit member is then press-fitted inside the armature core configured by the plural core configuration members coupled together in a ring shape, to give a state in which the armature core is spread out toward the radial direction outside, enabling rattling of the armature core to be suppressed.

An armature of an nineteenth aspect includes plural core configuration members that configure an armature core and are divided in a circumferential direction of the armature core, plural insulators that each include a pair of insulation portions integrated with the core configuration members and a coupling portion that couples the pair of insulation portions together, and plural coil wires that each include a pair of wound portions that has been wound onto the respective core configuration member with the insulation portions interposed between the core configuration members and the wound portions, and a crossing wire that connects together the pair of wound portions. Wherein, plural armature configuration units are configured independently of each other by integrating a pair of the core configuration members with each of the plural insulators and winding the respective coil wire onto the pair of core configuration members. Assuming that a number of the plural core configuration members is n, in each of the plural armature configuration units, one of the core configuration members is disposed with respect to the other of the core configuration members at a mechanical angle in a range of (360°/n)×2 or greater and less than 18020, and in the armature configuration units that configure the same phase out of the plural armature configuration units, the coupling portion and the crossing wire of one of the armature configuration units are arranged side by side with the coupling portion and the crossing wire of the other of the armature configuration units along a direction orthogonal to an axial direction of the plural armature configuration units.

According to this armature, in each of the plural armature configuration units, one of the core configuration members is disposed with respect to the other of the core configuration members at a mechanical angle in a range of (360°/n)×2 or greater and less than 180°. Space can accordingly be secured at the periphery of the core configuration members when using a winding machine to wind the coil wires onto the core configuration members. The winding machine can accordingly be suppressed from impinging on other core configuration members when winding the coil wires onto one of the core configuration members in the respective armature configuration units, enabling an improvement in work efficiency during coil winding. Moreover, in the armature configuration units that configure the same phase, the coupling portion and the crossing wire of one of the armature configuration units are arranged side by side with the coupling portion and the crossing wire of the other of the armature configuration units along a direction orthogonal to an axial direction of the plural armature configuration units. Since the pair of crossing wires do not intersect with each other in the armature configuration units configuring the same phase, an increase in the axial length of the armature can be suppressed even when the plural armature configuration units are assembled together to configure the armature. A shorter axial length of the armature is accordingly enabled than when the pair of crossing wires intersects with each other in armature configuration units configuring the same phase.

An armature manufacturing method of a twentieth aspect of the present invention is a manufacturing method of the armature of the nineteenth aspect, including an armature configuration unit assembly process in which the mutually independent plural armature configuration units are each assembled by integrating a pair of the core configuration members with each of the plural insulators, and winding the respective coil wire onto the pair of core configuration members, and an armature assembly process in which the plural armature configuration units are assembled together to form the armature. Wherein, in the armature configuration unit assembly process, a molded member is employed that integrally includes the plural insulators and a connector portion that connects the plural insulators, and the core configuration members are integrated with the insulators, and the respective coil wire is wound onto the core configuration members, in a connected state of the plural insulators by the connector portion, and the connector portion is removed between the armature configuration unit assembly process and the armature assembly process.

According to this armature manufacturing method, employing the molded member that integrally includes the plural insulators and the connector portion that connects the plural insulators enables a reduction in the number of components and the number of process during manufacture of the armature.

Note that the molded member that integrally includes the plural insulators and the connector portion that connects the plural insulators in a ring shape, may be employed in the armature configuration unit assembly process.

According to this armature manufacturing method, the coil wires can be easily wound onto the respective core configuration members whilst rotating the molded member, that is connected in a ring shape by the connector portion, about its axial center.

An armature of a twenty-first aspect of the present invention includes plural core configuration members that configure an armature core and are divided in a circumferential direction of the armature core, plural core insulation members that are integrated to the respective core configuration members, plural coupling portions that couple together the plural core insulation members, and plural coil wires that each include a pair of wound portions that has been wound onto the respective core configuration member with the core insulation members interposed between the core configuration members and the wound portions, and a crossing wire that connects together the pair of wound portions. Wherein, plural armature configuration units are configured independently of each other by coupling together respective pairs of the core insulation members out of the plural core insulation members using the coupling portions, and winding the respective coil wires onto pairs of the core configuration members integrated with the pairs of core insulation members. Assuming that a number of the plural core configuration members is n, in each of the plural armature configuration units, one of the core configuration members is disposed with respect to the other of the core configuration members at a mechanical angle that is in a range of (360°/n)×2 or greater and less than 180°, and in the armature configuration units that configure the same phase out of the plural armature configuration units, the coupling portion and the crossing wire of one of the armature configuration units are arranged side by side with the coupling portion and the crossing wire of the other of the armature configuration units along a direction orthogonal to an axial direction of the plural armature configuration units.

According to this armature, in each of the plural armature configuration units, one of the core configuration members is disposed with respect to the other of the core configuration members at a mechanical angle in a range of (360°/n)×2 or greater and less than 180°. Space can accordingly be secured at the periphery of the core configuration members when using a winding machine to wind the coil wires onto one of the core configuration members. The winding machine can accordingly be suppressed from impinging on other core configuration members when winding the coil wires onto one of the core configuration members in the respective armature configuration units, enabling an improvement in work efficiency during coil winding. Moreover, in the armature configuration units configuring the same phase, the coupling portion and the crossing wire of one of the armature configuration units are arranged side by side with the coupling portion and the crossing wire of the other of the armature configuration units along a direction orthogonal to an axial direction of the plural armature configuration units. Since the pair of crossing wires does not intersect with each other in the armature configuration units configuring the same phase, an increase in the axial length of the armature can be suppressed even when the plural armature configuration units are assembled together to from the armature. A shorter axial length of the armature is accordingly enabled than when the pair of crossing wires intersects with each other in armature configuration units configuring the same phase. Moreover, since the coupling members are configured as separate bodies to the core insulation members, the core insulation members are less complex in shape, enabling easier manufacture of the of the core insulation members than when the coupling members are integrally formed to the core insulation members.

BRIEF DESCRIPTION OF THE DRAWINGS

Embodiments of the present invention will be described in detail based on the following figures, wherein.

DETAILED DESCRIPTION OF THE INVENTION

Explanation follows regarding an exemplary embodiment of the present invention, with reference to the drawings.

Figure 1:
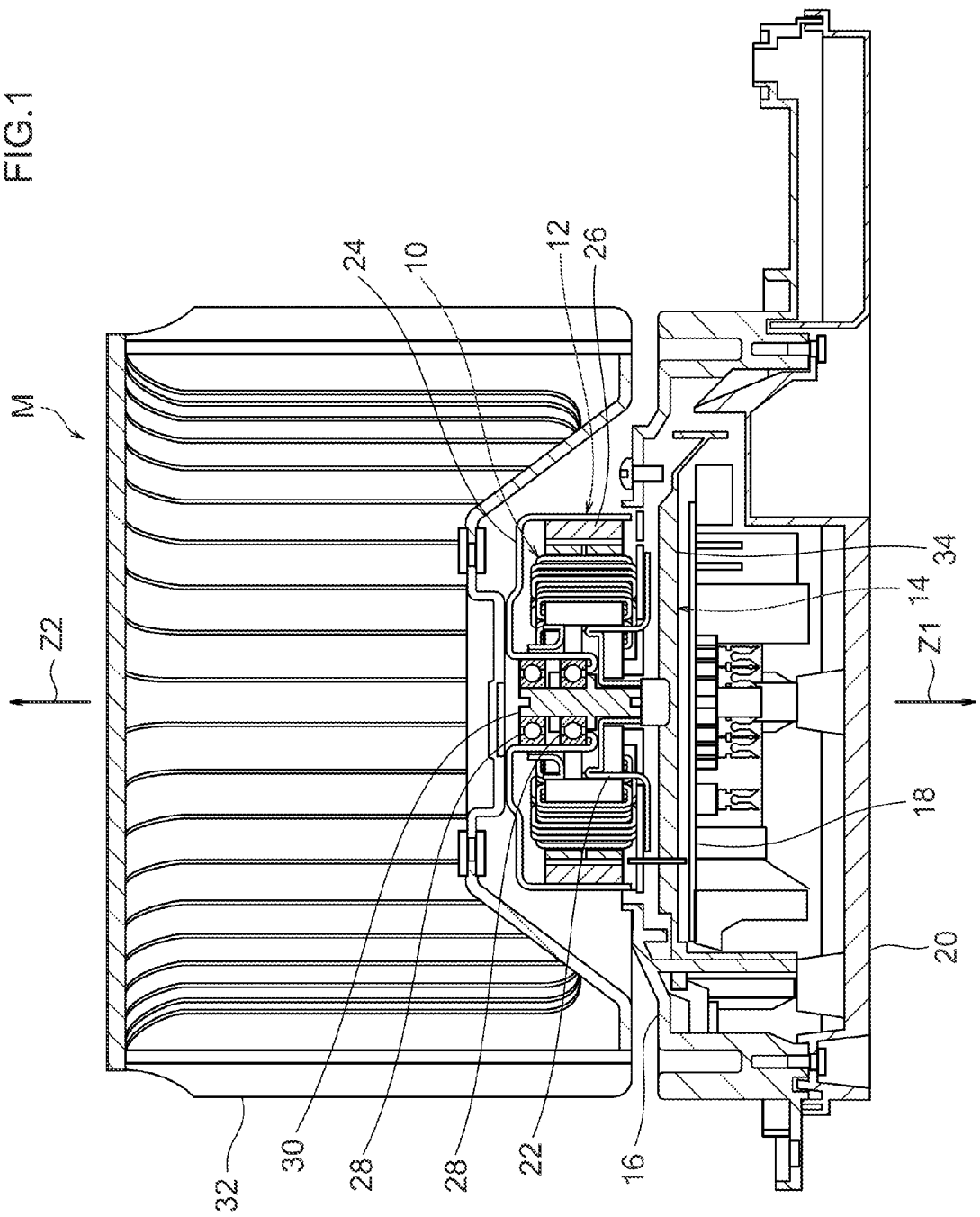
FIG. 1 is a vertical cross-section of a rotating electrical device according to a present exemplary embodiment.

As illustrated in FIG. 1, a rotating electrical device M according to the present exemplary embodiment includes an armature 10 that is a stator, a rotor 12, a centerpiece 14, a motor holder 16, a circuit board 18, and a case 20.

Specifically, the armature 10 is configured as described below, and is formed in a ring shape. A shaft section 22 provided at an axial center portion of the centerpiece 14 is press-fitted inside the armature 10, such that the armature 10 is supported by the centerpiece 14.

The rotor 12 includes a housing 24 with a lidded cylinder shape, and magnets 26 fitted to an inner peripheral face of the housing 24. The magnets 26 are provided at the radial direction outside of the armature 10, facing toward the armature 10. A pair of bearing 28 is provided at the axial center portion of the housing 24, and a rotation shaft 30 is press-fitted inside the pair of bearing 28. The rotation shaft 30 is supported by a pair of shaft sections 22, such that the rotor 12 is rotatable with respect to the armature 10 and the centerpiece 14. As an example, a sirocco fan 32 is fixed to the rotor 12 so as to be rotatable as a unit therewith.

The centerpiece 14 includes a circular disk shaped main body portion 34, and the main body portion 34 is provided facing toward an opening in the housing 24. The motor holder 16 is assembled to the main body portion 34 from the armature 10 side of the main body portion 34, and the circuit board 18 is fixed to the main body portion 34 from the opposite side to the armature 10 side of the main body portion 34. The case 20 is assembled to the main body portion 34 and the motor holder 16 from the opposite side to the main body portion 34 side of the circuit board 18.

Detailed explanation follows regarding the armature 10.

Figure 2:
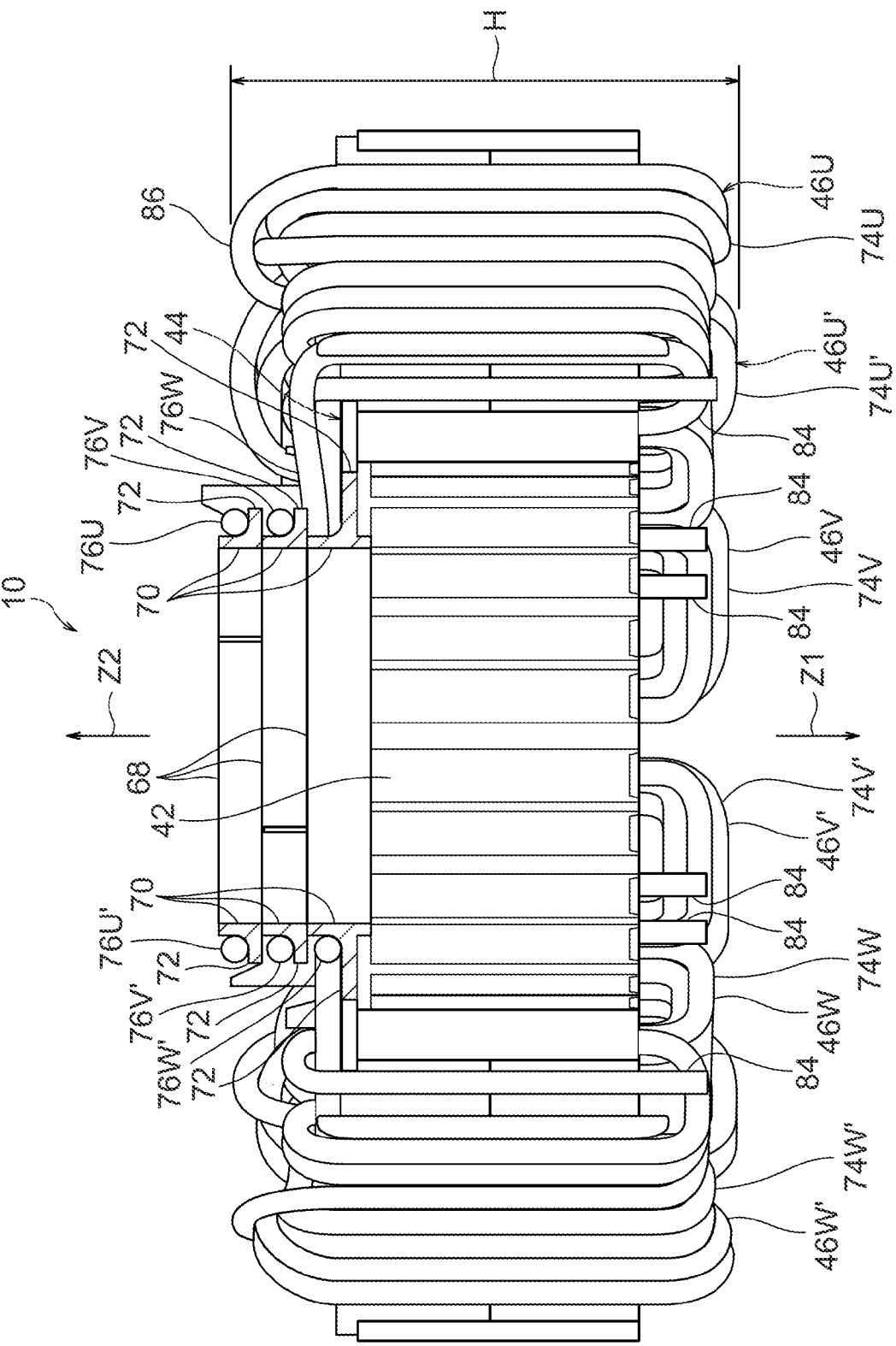
FIG. 2 is a vertical cross-section of an armature according to the present exemplary embodiment.
Figure 3:
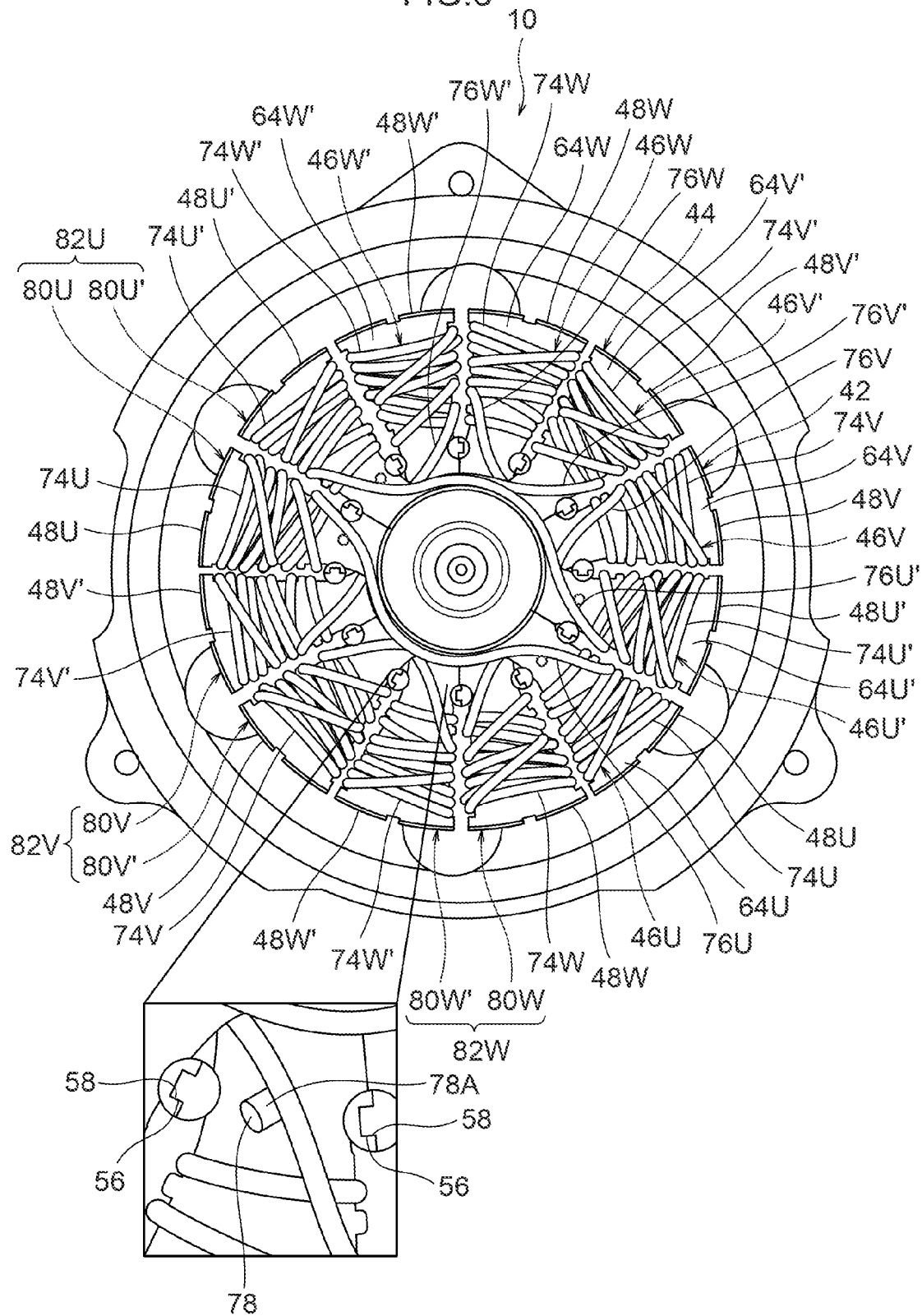
FIG. 3 is a plan view of an armature and a centerpiece according to the present exemplary embodiment.

As illustrated in FIG. 2 and FIG. 3, the armature 10 includes an armature core 42, an insulating member 44, and plural coil wires 46U, 46U', 46V, 46V', 46W, 46W' that configure three phases, namely a U phase, a V phase, and a W phase. Note that in each of the drawings, the arrow Z1 illustrates one side in an axial direction of the armature 10, and the arrow Z2 indicates the other side in the axial direction of the armature 10.

Figure 4:
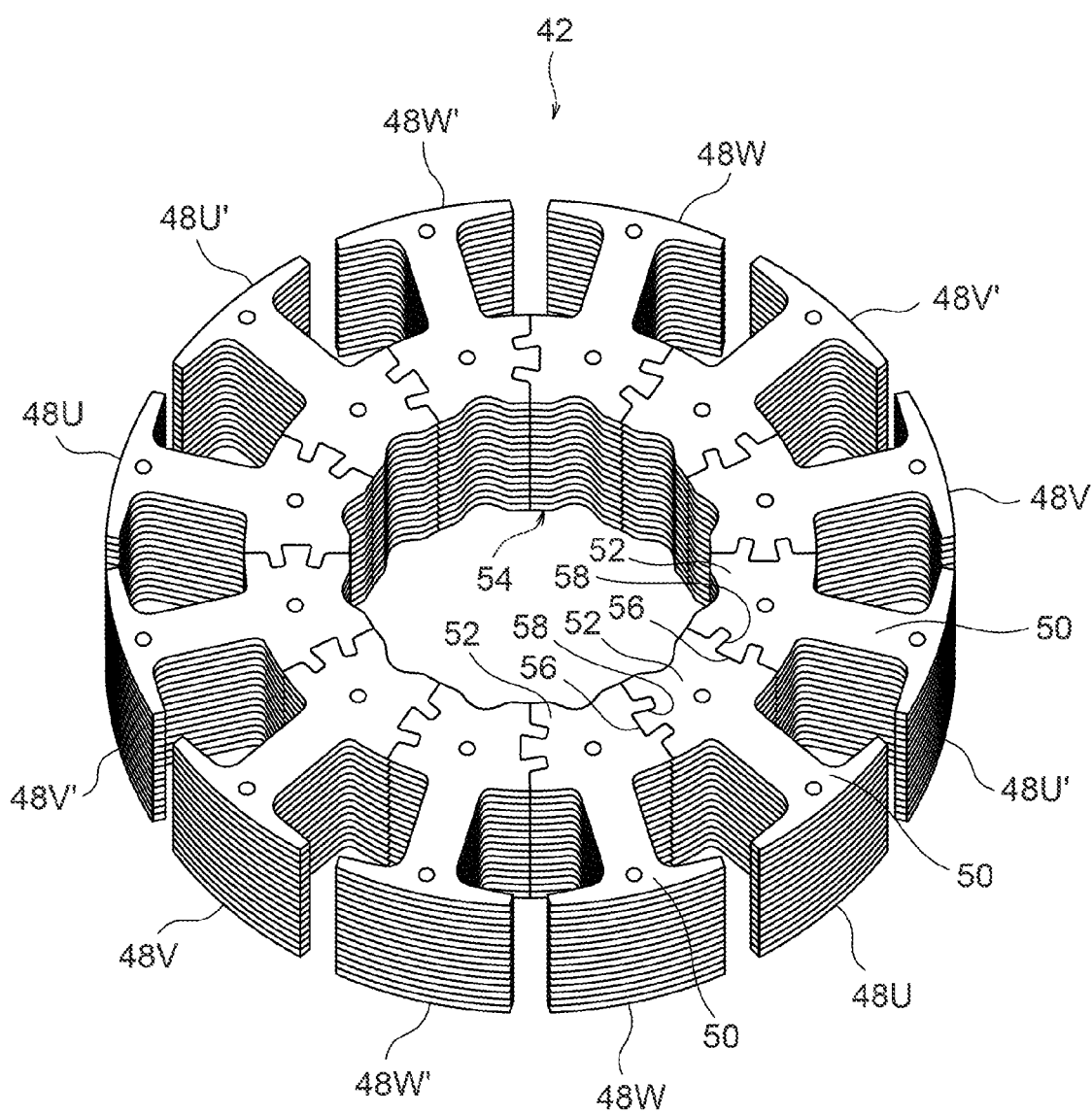
FIG. 4 is a perspective view of an armature core according to the present exemplary embodiment.

The armature core 42 is a divided core, and, as illustrated in FIG. 4, is configured by twelve individual core configuration members 48U, 48U', 48V, 48V', 48W, 48W' divided in the circumferential direction of the armature core 42. The plural core configuration members 48U to 48W' each include a tooth portion 50 formed in a substantially T-shape, and a yoke configuration member 52 formed to a base end portion of the tooth portion 50. In a state in which the plural core configuration members 48U to 48W' are arrayed in a ring shape, the plural yoke configuration members 52 form a ring shaped yoke 54, and the plural tooth portions 50 are disposed in a radiating shape at the yoke periphery.

Each of the plural core configuration members 48U to 48W' is provided with a protrusion shaped engaging portion 56, and an indent shaped engaged portion 58. The protrusion shaped engaging portions 56 are formed to one side portion of each of the yoke configuration members 52, and the engaged portions 58 are formed to the other side portion of each of the yoke configuration members 52. The plural core configuration members 48U to 48W' are coupled together in a ring shape by engagement of the engaging portions 56 with adjacent engaged portions 58 in the circumferential direction.

Figure 5:
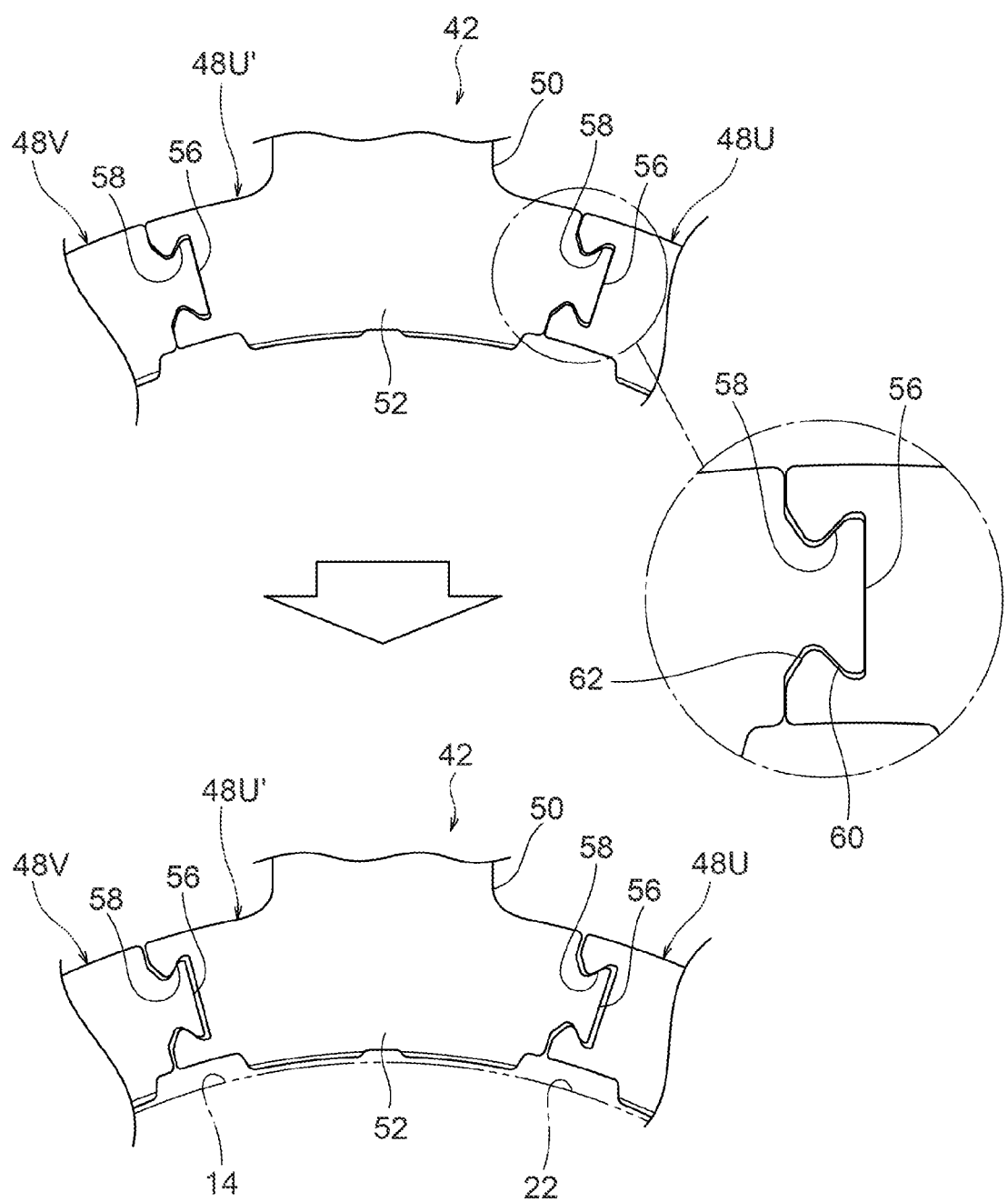
FIG. 5 is an enlarged plan view of relevant portions before and after press-fitting a shaft portion of a centerpiece inside an armature core according to the present exemplary embodiment.

As illustrated in FIG. 5, a constriction portion 60 is formed to a base end portion of each of the protrusion shaped engaging portions 56, and a tapered portion 62 corresponding to the shape of the constriction portion 60 is formed to an opening portion of each of the indention shaped engaged portions 58. The engaging portions 56 with the constriction portion 60, and the engaged portions 58 with the tapered portion 62 are formed with dimensions and shapes that enable them to fit together with play therebetween.

In a state in which the armature core 42 has been configured by coupling together the plural core configuration members 48U to 48W' in a ring shape as described above (see FIG. 4), the shaft section 22 (press-fit member) of the centerpiece 14 is press-fitted inside the armature core 42, as illustrated in a drawing indicated at the bottom of FIG. 5. When the shaft section 22 has been press-fitted inside the armature core 42, the engaging portions 56 and the engaged portions 58 fitted together with play therebetween are pulled out around the circumferential direction of the armature core 42, to give a state in which the armature core 42 is spread out to the radial direction outside.

Figure 6:
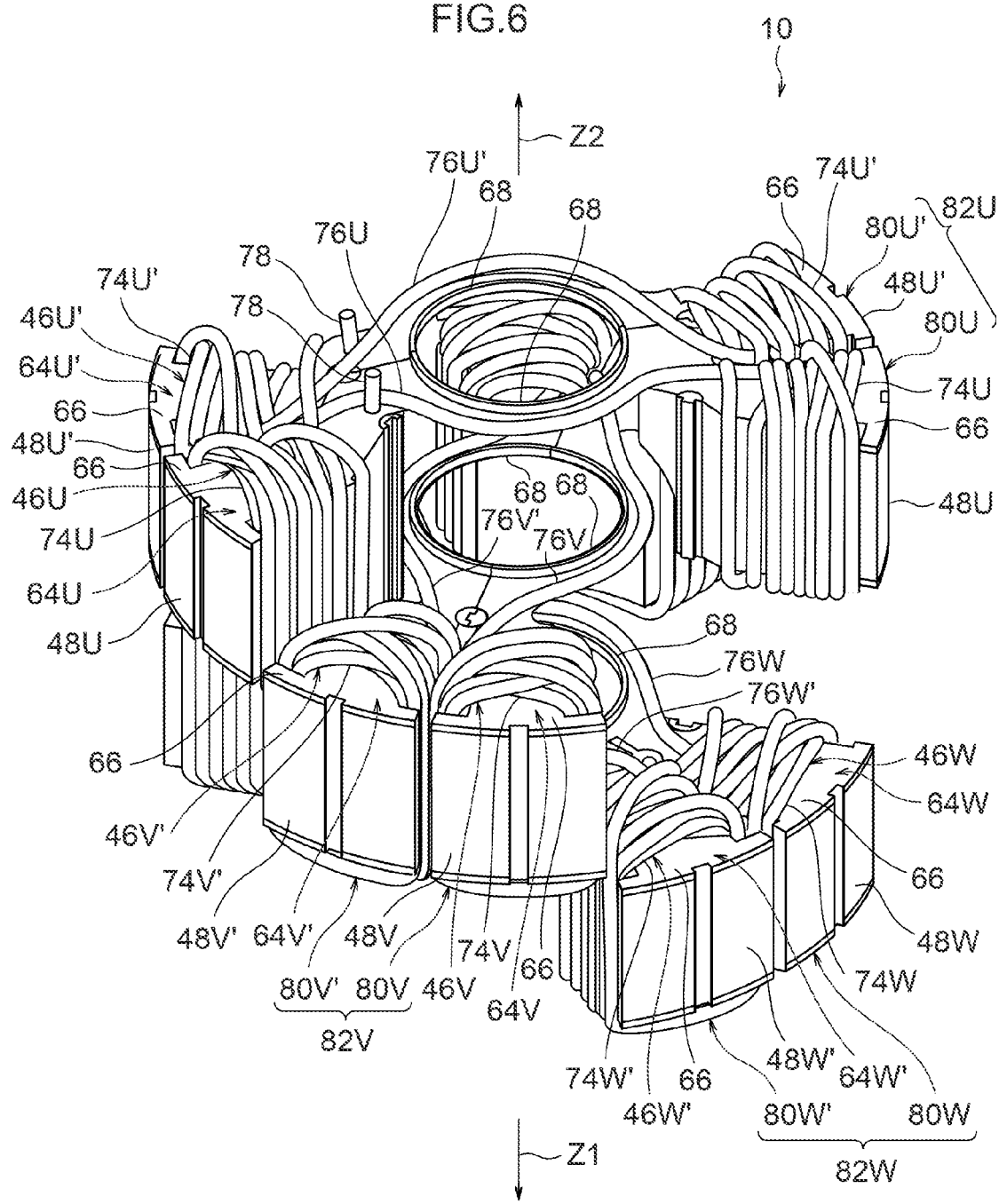
FIG. 6 is a perspective view illustrating a process in which plural armature configuration sections according to the present exemplary embodiment are assembled together.

As illustrated in FIG. 6, the insulating member 44 is divided into six insulators 64U, 64U', 64V, 64V', 64W, 64W'. The insulator 64U and the insulator 64U' of the U phase are formed symmetrically to each other about a plane defined along the axial direction of the armature 10. Similarly, the insulator 64V and the insulator 64V' of the V phase are formed symmetrically to each other about a plane as defined along the axial direction of the armature 10, and the insulator 64W and the insulator 64W' of the W phase are formed symmetrically to each other about a plane as defined along the axial direction of the armature 10.

Each of the plural insulators 64U to 64W includes a pair of insulation portions 66 and a coupling portion 68. Each of the insulation portions 66 has an external profile substantially the same as that of the respective core configuration members 48U to 48W', and each of the core configuration members 48U to 48W' is covered from the two axial direction sides of the armature 10 by mounting each of the insulation portions 66 to the respective core configuration members 48U to 48W'.

Each of the coupling portions 68 is formed in a circular arc shape along an inner radial portion of the respective plural core configuration members 48U to 48W', and is coupled to end portions of the pair of insulation portions 66 positioned on the other axial direction side (the arrow Z2 side) of the armature 10. A pair of the coupling portions 68 formed to the insulators 64U, 64U' have the same radius as each other, so as to form a ring shape when viewed along the axial direction of the armature 10. Similarly, a pair of the coupling portions 68 formed to the insulators 64V, 64V' have the same radius as each other, so as to form a ring shape when viewed along the axial direction of the armature 10. A pair of the coupling portions 68 formed to the insulators 64W, 64W' also have the same radius as each other, so as to form a ring shape when viewed along the axial direction of the armature 10.

Moreover, as illustrated in FIG. 2, each of the coupling portions 68 is formed with a substantially L-shaped cross-section, including a guide portion 70 formed with a height direction along the armature 10 axial direction, and a restriction portion 72 extending out toward the radial direction outside of the coupling portion 68 from one end side (the arrow Z1 side) in the height direction of the guide portion 70.

Figure 13:
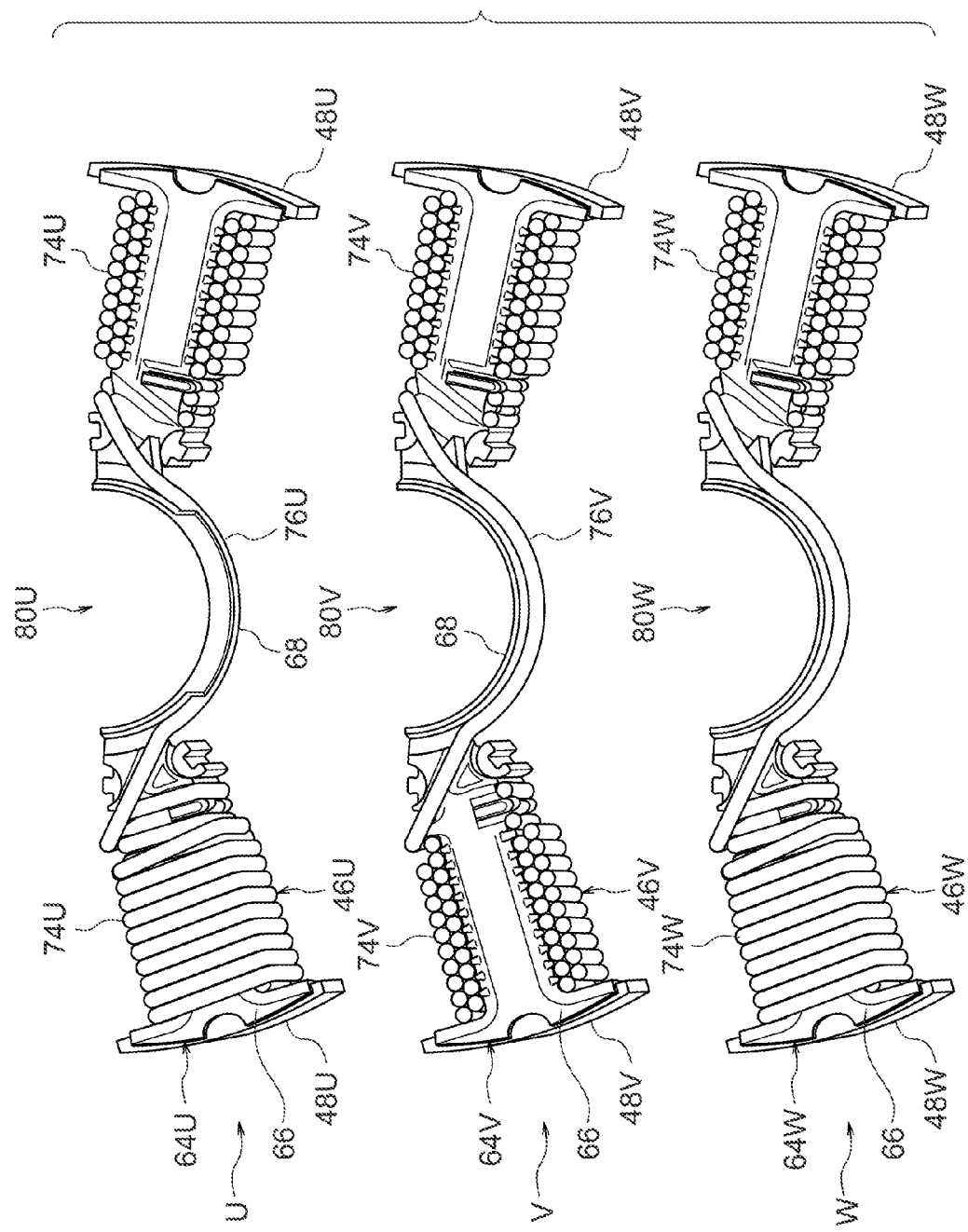
FIG. 13 is a drawing to compare U phase, V phase, and W phase armature configuration units according to the present exemplary embodiment in plan view.
Figure 14:
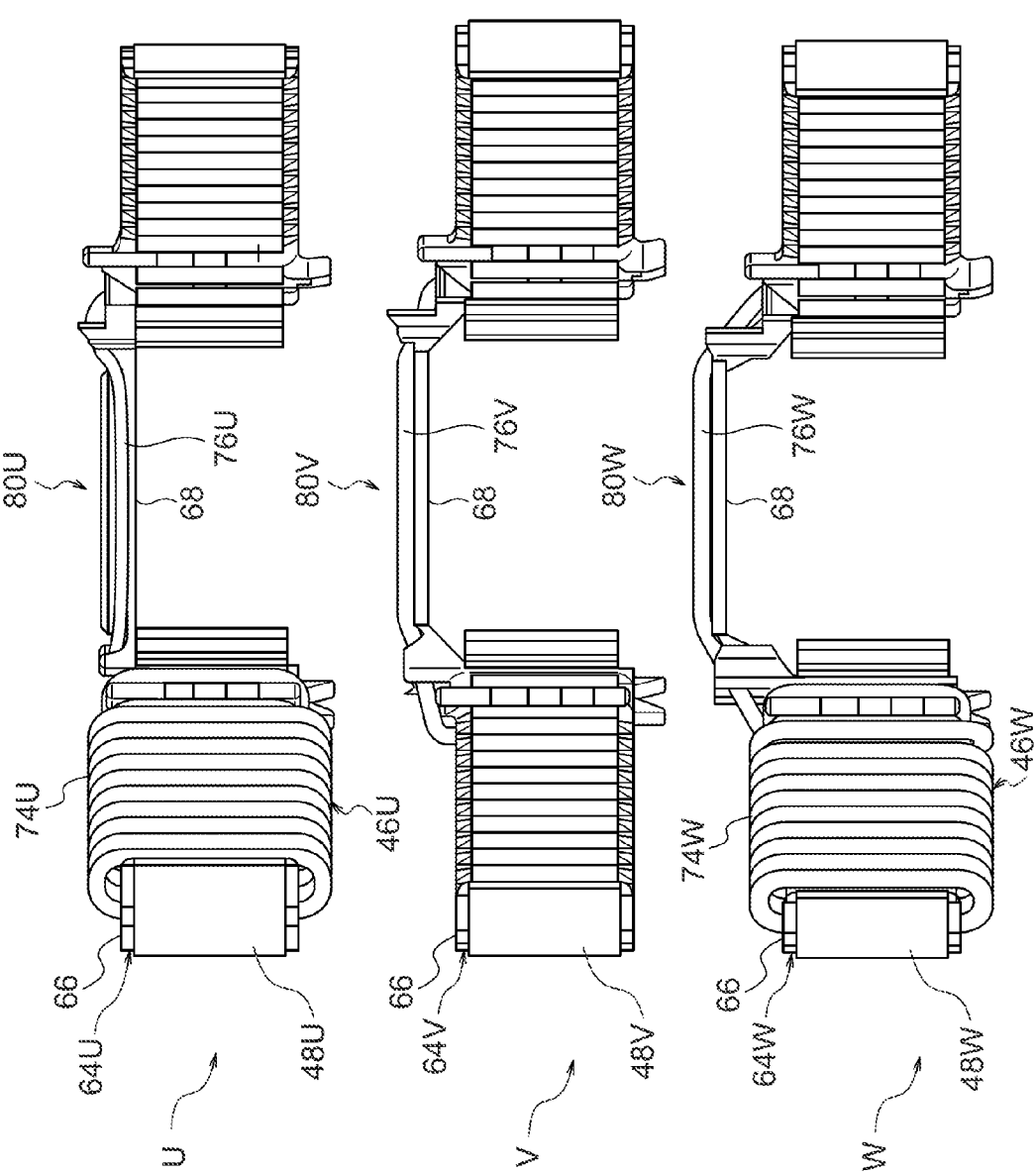
FIG. 14 is a drawing to compare U phase, V phase, and W phase armature configuration units according to the present exemplary embodiment in side view.

As illustrated in FIG. 6, the insulators 64U, 64V, 64W are formed in substantially the same shape as each other, except for in the location where the coupling portion 68 is formed in the axial direction and radial direction of the armature 10, and the shape of the coupling portion 68. Similarly, the insulators 64U', 64V', 64W' are formed in substantially the same shape as each other, except for in the location where the coupling portion 68 is formed in the axial direction and radial direction of the armature 10, and the shape of the coupling portion 68. FIG. 13 and FIG. 14 illustrate, as an example, a comparison of the shapes in the insulators 64U, 64V, 64W, in which the coupling portions 68 are formed in different locations and shapes.

Although not shown in detail in the drawings, each of the insulators 64U to 64W' is configured by an upper insulator including upper portions of the pair of insulation portions 66 and the coupling portion 68, and a pair of lower insulators that form only lower portions of the pair of insulation portions 66.

Figure 7:
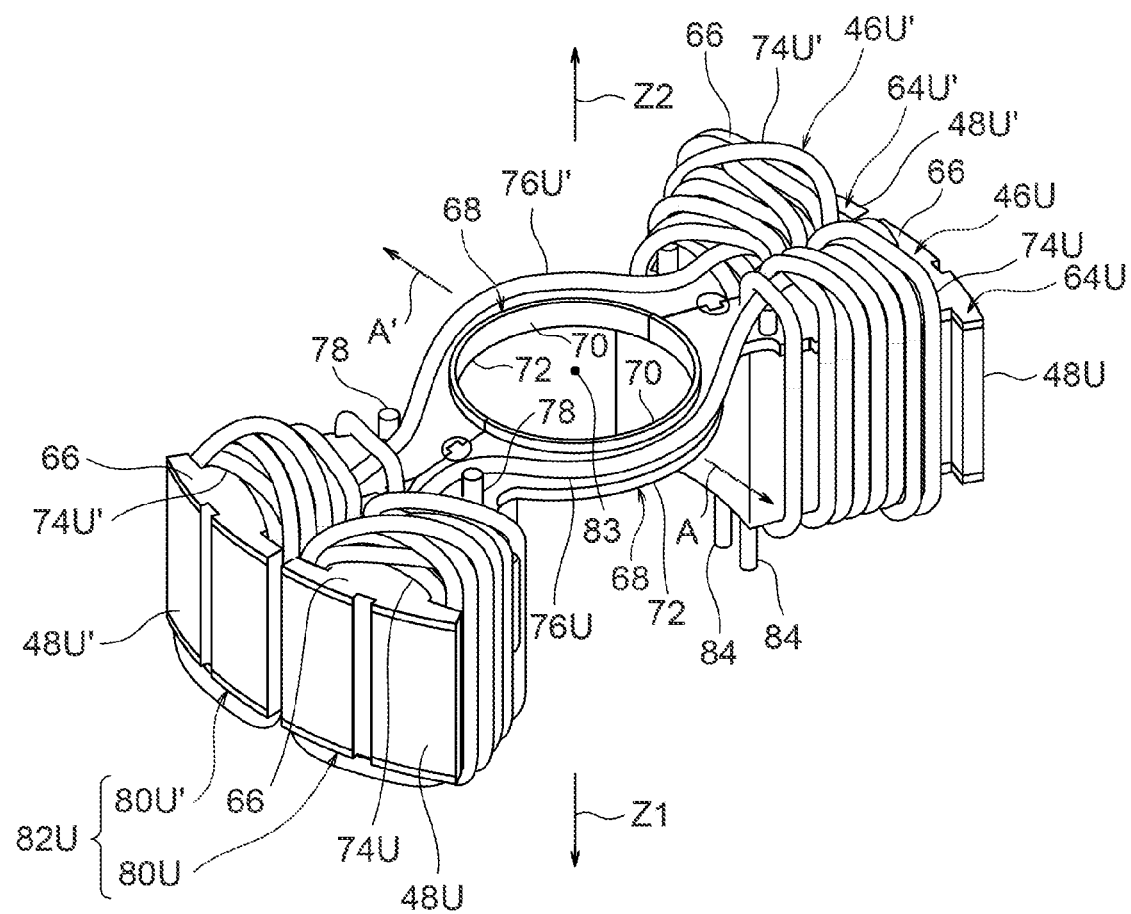
FIG. 7 is a perspective view of an armature configuration section according to the present exemplary embodiment.
Figure 8:
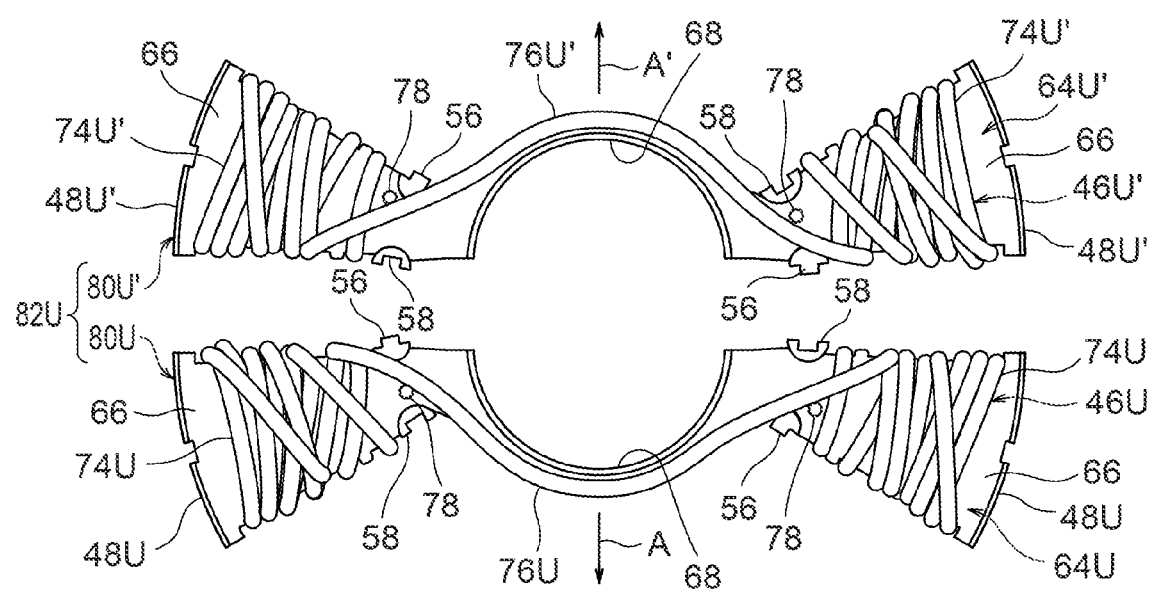
FIG. 8 is an exploded plan view of an armature configuration section according to the present exemplary embodiment.

As illustrated in FIG. 7 and FIG. 8, the coil wire 46U configuring the U phase includes a pair of wound portions 74U of concentrated coil wire wound onto the core configuration members 48U, with the insulation portions 66 interposed therebetween, and a crossing wire 76U connecting together the pair of wound portions 74U. Similarly, the coil wire 46U' configuring the U phase includes a pair of wound portions 74U' of concentrated coil wire wound onto the core configuration members 48U', with the insulation portions 66 interposed therebetween, and a crossing wire 76U' connecting together the pair of wound portions 74U'.

The pair of wound portions 74U have been wound in a forward direction, and the pair of wound portions 74U' have been wound in the opposite direction. Each of the wound portions 74U is wound in a tightening direction such that a winding end portion or a winding start portion is positioned on the opposite side to the side where the coupling portion 68 juts out from of the pair of core configuration members 48U (the arrow A side). Similarly, each of the wound portions 74U' is wound in a tightening direction such that a winding end portion or a winding start portion is positioned on the opposite side to the side where the other coupling portion 68 juts out from of the pair of core configuration members 48U' (the arrow A' side).

As illustrated in FIG. 7, the pair of crossing wires 76U, 76U' are both disposed so as to follow the coupling portions 68. More specifically, the crossing wires 76U, 76U' are disposed along the outer peripheral faces of the guide portions 70, and supported from the radial direction inside of the coupling portion 68 by the guide portions 70. The crossing wires 76U, 76U' are supported from the one axial direction side of the armature 10 (the arrow Z1 side) by the restriction portion 72.

As illustrated in FIG. 6, similarly to the coil wire 46U described above, the coil wire 46V configuring the V phase includes a pair of wound portions 74V of concentrated coil wire wound onto the core configuration members 48V, with the insulation portions 66 interposed therebetween, and a crossing wire 76V connecting together the pair of wound portions 74V. Similarly to the coil wire 46U' described above, the coil wire 46V' configuring the V phase includes a pair of wound portions 74V' of concentrated coil wire wound onto the core configuration members 48V', with the insulation portions 66 interposed therebetween, and a crossing wire 76V' connecting together the pair of wound portions 74V'.

Similarly, the coil wire 46W configuring the W phase includes a pair of wound portions 74W of concentrated coil wire wound onto the core configuration members 48W, with the insulation portions 66 interposed therebetween, and a crossing wire 76W connecting together the pair of wound portions 74W. Similarly, the coil wire 46W' includes a pair of wound portions 74W' of concentrated coil wire wound onto the core configuration members 48W', with the insulation portions 66 interposed therebetween, and a crossing wire 76W' connecting together the pair of wound portions 74W'. The crossing wires 76V to 76W' are supported by the guide portions 70 and the restriction portions 72 of the coupling portions 68, similarly to the U phase crossing wires 76U and 76U' described above (see also FIG. 2).

Figure 9:
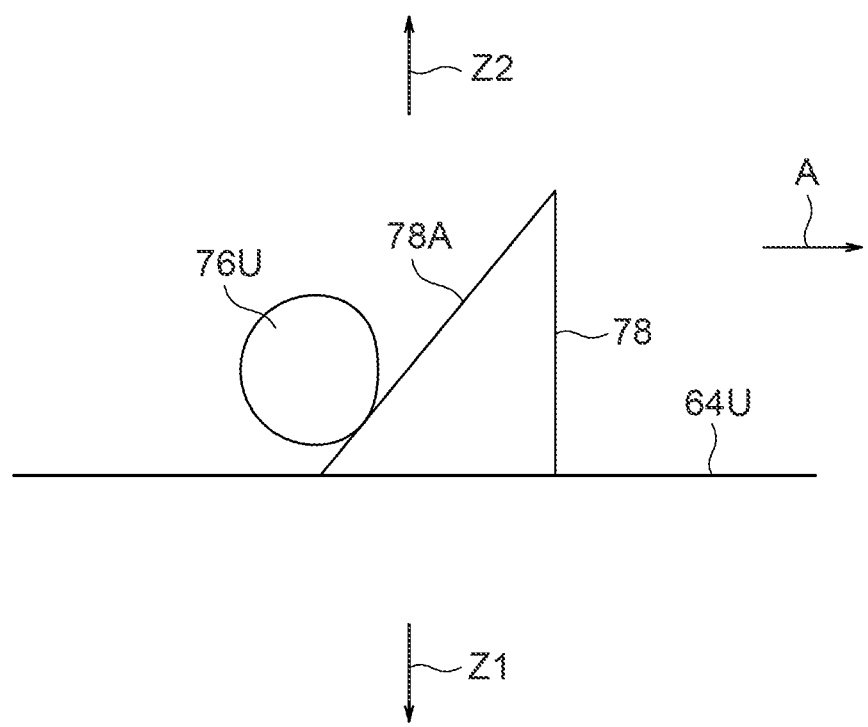
FIG. 9 is a vertical cross-section schematically illustrating a guide projection and the periphery thereof according to the present exemplary embodiment.

As illustrated in FIG. 7 and FIG. 8, guide projections 78 are provided to portions of the insulator 64U connecting between the respective insulation portions 66 and the coupling portion 68, and have a height direction in the axial direction of the armature 10 (projecting toward the other axial direction side of the armature 10). As schematically illustrated in FIG. 9, each of the guide projections 78 includes an inclined face 78A disposed further toward the side to which the coupling portion 68 juts out (the arrow A side) on progression toward the upper side in the height direction (the arrow Z2 side). The end portions of the crossing wire 76U are respectively guided (supported) by the inclined faces 78A of the guide projections 78, and are placed between the engaging portions 56 and the engaged portions 58 formed at side portions on both sides of the respective core configuration members 48U (see FIG. 8). The guide projections 78 are also formed to the insulators 64U' to 64W' (see FIG. 6 etc.), and the crossing wires 76U' to 76W' are guided by the guide projections 78 similarly to the crossing wire 76U.

In the armature 10, as illustrated in FIG. 8, an armature configuration unit 80U is configured by assembling the pair of core configuration members 48U to one of the insulators 64U configuring the U phase, and winding the coil wire 46U onto the pair of core configuration members 48U. An armature configuration unit 80U' is also configured by assembling the pair of core configuration members 48U' to the other of the insulators 64U configuring the U phase, and winding the coil wire 46U' onto the pair of core configuration members 48U'.

Similarly to the armature configuration units 80U, 80U' of the U phase, armature configuration units 80V, 80V', 80W, 80W' are also configured for the V phase and the W phase (see FIG. 6). The six armature configuration units 80U to 80W' are each configured independently of each other.

As illustrated in FIG. 6, in each of the armature configuration units 80U to 80W', the pairs of core configuration members 48U to 48W' are respectively placed so as to leave a gap equivalent to a length of four of the core configuration members in the circumferential direction of the coupling portion 68. Namely, in the armature configuration unit 80U, gaps are provided between the pair of core configuration members 48U in which the two individual core configuration members 48V, 48V' of the V phase and the two individual core configuration members 48W, 48W' of the W phase are placed. Similarly, in the armature configuration unit 80U', gaps are provided between the pair of core configuration members 48U' in which the two individual core configuration members 48V, 48V' of the V phase and the two individual core configuration members 48W, 48W' of the W phase are placed. Similar also applies to the armature configuration units 80V to 80W'.

Thus, in the present exemplary embodiment in which the number of plural core configuration members 48U to 48W' n=12, in the armature configuration unit 80U of the U phase, one of the core configuration members 48U is disposed with respect to the other of the core configuration members 48U at a mechanical angle in a range of $(360°/n) \times 2$ or greater, and less than $180°$. Similarly, in each of the other armature configuration units 80U' to 80W', one of the core configuration members is disposed with respect to the other of the core configuration members at a mechanical angle in a range of $(360°/n) \times 2$ or greater, and less than $180°$.

As illustrated in FIG. 6, the six armature configuration units 80U to 80W' are combined such that the units configuring the same phase as each other are combined together adjacently around the circumferential direction to configure three armature configuration sections 82U, 82V, 82W. Namely, the armature configuration units 80U, 80U' are combined together to configure the armature configuration section 82U (see FIG. 7). Similarly, the armature configuration units 80V, 80V' are combined together to configure the armature configuration section 82V, and the armature configuration units 80W, 80W' are combined together to configure the armature configuration section 82W.

Fixing of the pair of armature configuration units 80U, 80U' configuring the armature configuration section 82U is performed by engaging the engaging portion 56 and the engaged portion 58 of the circumferential direction adjacent core configuration members 48U, 48U' (see FIG. 4). Similar also applies to fixing of the pair of armature configuration units 80V, 80V' configuring the armature configuration section 82V, and to fixing of the pair of armature configuration units 80W, 80W' configuring the armature configuration section 82W.

Moreover, as illustrated in FIG. 7, in the armature configuration section 82U, the pair of crossing wires 76U, 76U' are respectively disposed along the pair of the coupling portions 68. Moreover, in the armature configuration section 82U, the coupling portion 68 and the crossing wire 76U provided to the armature configuration unit 80U (one of the coupling portions 68 and one of the crossing wires 76), and the coupling portion 68 and the crossing wire 76U' provided to the armature configuration unit 80U' (the other of the coupling portions 68 and the other of the crossing wires 76), are provided so as to separate to one side (the arrow A side) and the other side (the arrow A' side) of an axial center portion 83 of the armature configuration section 82U. The axial center portion 83 of the armature configuration section 82U corresponds to the central portion in the radial direction of the armature configuration section 82U (the central portion of the pair of coupling portions 68 forming a ring shape). The pair of coupling portions 68 provided to the armature configuration section 82U form a ring shape in the combined state of the pair of the armature configuration units 80U, 80U'.

Similarly, as illustrated in FIG. 6, in the armature configuration section 82V, the coupling portion 68 and the crossing wire 76V provided to the armature configuration unit 80V, and the coupling portion 68 and the crossing wire 76V' provided to the armature configuration unit 80V', are provided so as to separate to one side and the other side of the axial center portion of the armature configuration section 82V. In the armature configuration section 82W, the coupling portion 68 and the crossing wire 76W provided to the armature configuration unit 80W, and the coupling portion 68 and the crossing wire 76W' provided to the armature configuration unit 80W', are provided so as to separate to one side and the other side of the axial center portion of the armature configuration section 82W. The pair of coupling portions 68 provided to the armature configuration section 82V form a ring shape in the combined state of the pair of the armature configuration units 80V, 80V', and the pair of coupling portions 68 provided to the armature configuration section 82W form a ring shape in the combined state of the pair of the armature configuration units 80W, 80W'.

Figure 10:
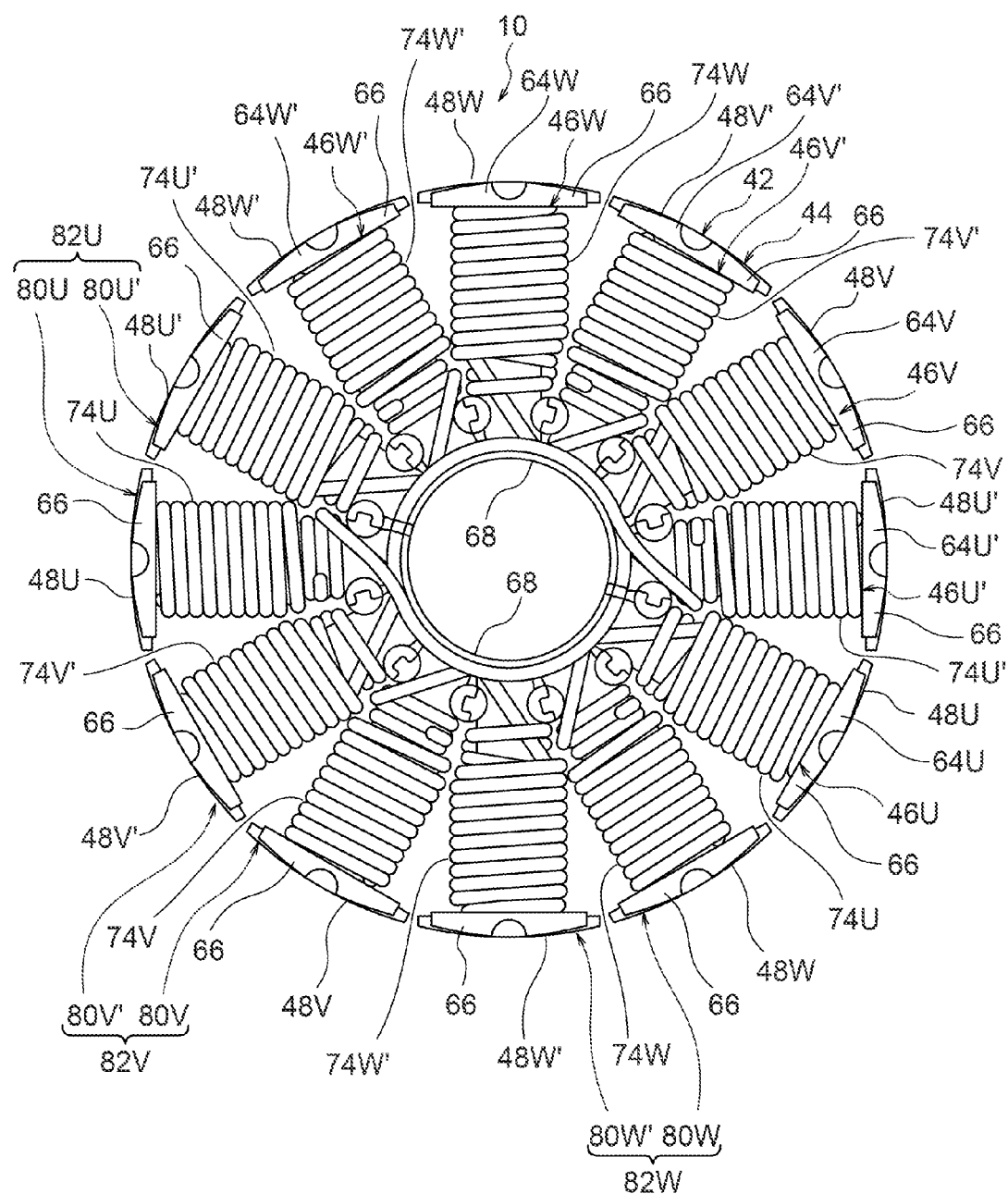
FIG. 10 is a plan view of an armature according to the present exemplary embodiment, as seen from a coupling portion side.

Then, as illustrated in FIG. 6, the plural armature configuration sections 82U to 82W are assembled together along the axial direction. When this is performed, the armature configuration section 82U of the U phase is the uppermost layer, the armature configuration section 82V of the V phase is an intermediate layer, and the armature configuration section 82W of the W phase is the lowermost layer. In a state in which the plural armature configuration sections 82U to 82W have been assembled together along the axial direction, the plural core configuration members 48U to 48W' are arrayed in the sequence U→U'→V-→V'→W→W'→U'→U→V'→V→W'→W running anti-clockwise, as viewed from the other axial direction side (the arrow Z2 side) of the armature 10 (see also FIG. 10).

Figure 11:
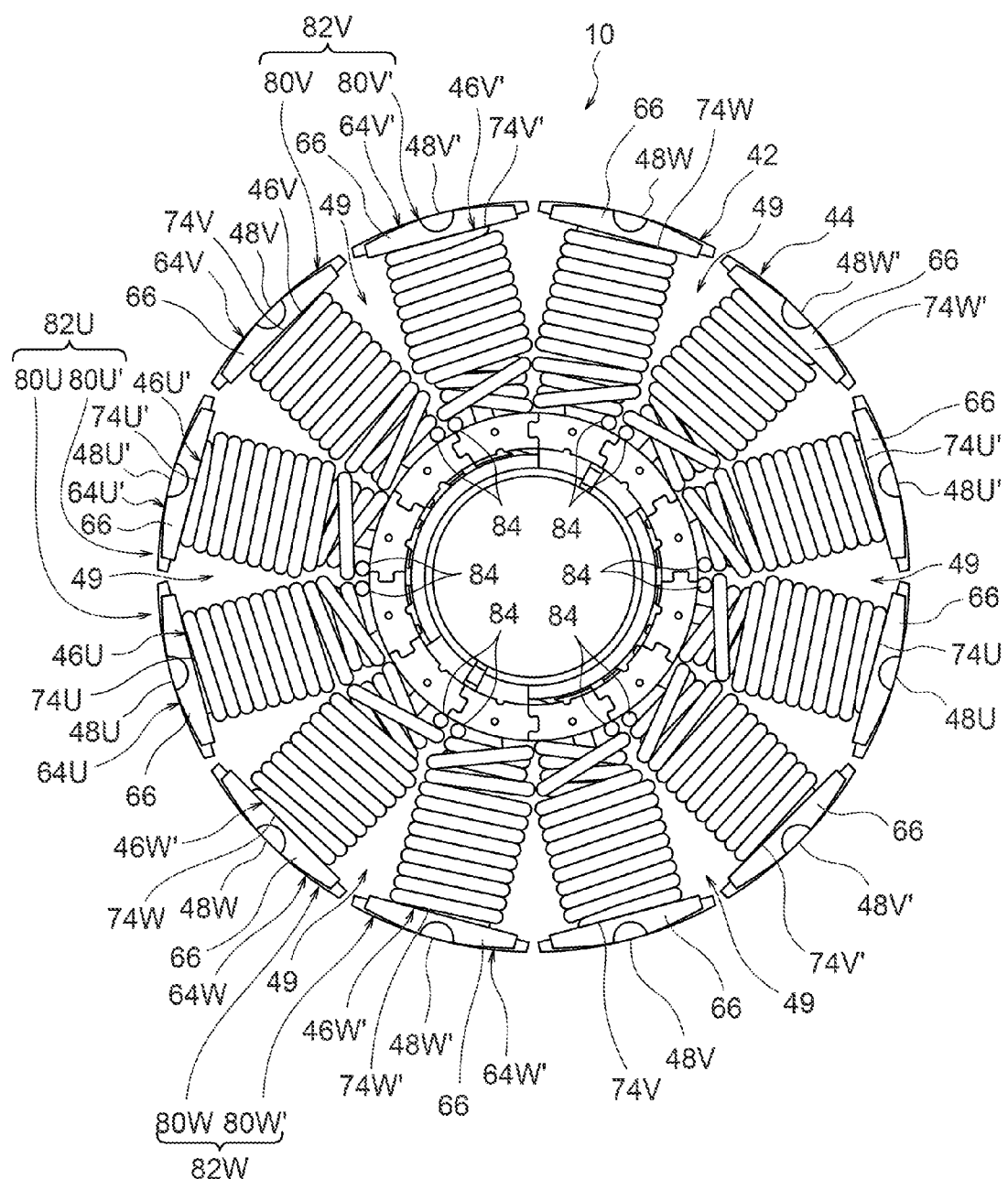
FIG. 11 is a view from the bottom face of an armature according to the present exemplary embodiment, as seen from the opposite side to the coupling portions.
Figure 12:
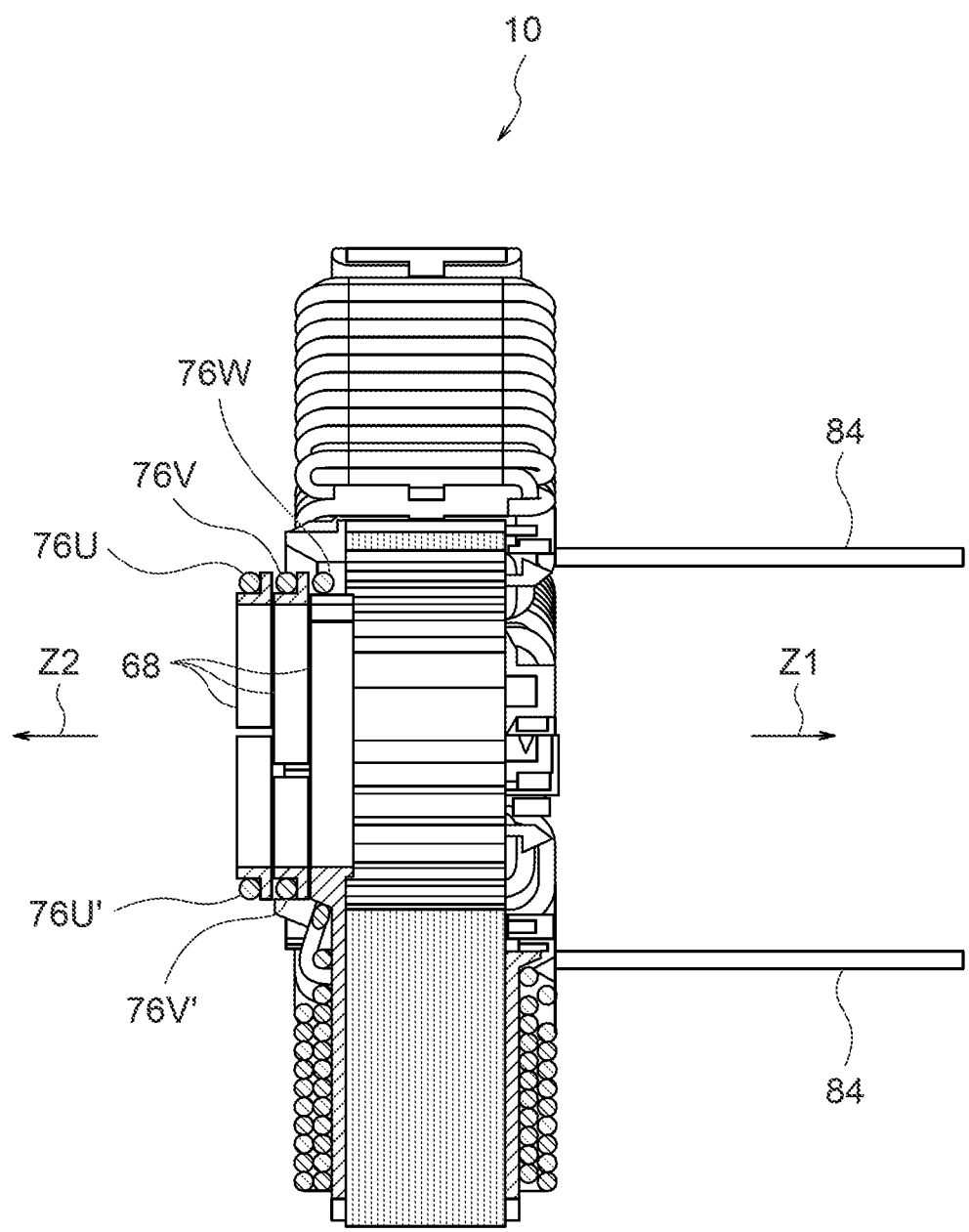
FIG. 12 is a side view including a partial cross-section of an armature according to the present exemplary embodiment.

As illustrated in FIG. 2, in an assembled together state of the plural armature configuration sections 82U to 82W as described above, terminal end portions 84 of each of the coil wires 46U to 46W' lead out to the one axial direction side (the arrow Z1 side) of the armature 10. As illustrated in FIG. 11 and FIG. 12, in the present exemplary embodiment, as an example, the terminal end portions 84 of the plural coil wires 46U to 46W' are disposed on the opposite side (the arrow Z1 side) to the coupling portion 68 side in the axial direction of the plural armature configuration units 80V to 80W'.

Moreover, as illustrated in FIG. 11, the terminal end portions 84 of coil wires of the same phase out of the plural coil wires 46U to 46W' are disposed within the same slot out of plural slots 49 formed between the plural core configuration members 48U to 48W'. Namely, the terminal end portions 84 of the coil wires 46U, 46U' of the U phase are disposed in the same slot 49 formed between the plural core configuration members 48U, 48U'. Similarly, the terminal end portions 84 of the coil wires 46V, 46V' of the V phase are disposed in the same slot 49 formed between the plural core configuration members 48V, 48V', and the terminal end portions 84 of the coil wires 46W, 46W' of the W phase are disposed in the same slot 49 formed between the plural core configuration members 48W, 48W'.

In the state in which the plural armature configuration sections 82U to 82W have been assembled together as described above, the plural coupling portions 68 are disposed at the other axial direction side (the arrow Z2 side) of the armature 10, in a row (overlapping with each other) along the axial direction of the armature 10.

In a state in which the plural armature configuration sections 82U to 82W have been thus assembled together, the plural crossing wires 76U to 76W' pass further to the inside than inner radial portions of the plural core configuration members 48. Out of the plural crossing wires 76U to 76W', the crossing wires 76V, 76V' in the armature configuration section 82V of the intermediate layer are disposed between the respective coupling portions 68 of the U phase and the W phase, that are the upper and lower layers.

Moreover, the coupling portions 68 in the armature configuration sections 82V, 82W, disposed in the intermediate layer and the lowermost layer, are disposed at the inside of the plural wound portions 74U to 74W' arrayed in a ring shape. The coupling portions 68 of the V phase and the W phase overlap in the axial direction of the armature 10 with the plural wound portions 74U to 74W'. Namely, in other words, if a length along the axial direction of the armature 10 of the plural wound portions 74U to 74W' arrayed in a ring shape is understood as a height of the plural wound portions 74U to 74W', then the coupling portions 68 of the V phase and the W phase that are the intermediate layer and the lowermost layer, are provided within a height range H of the plural wound portions 74U to 74W'. The coupling portions 68 of the V phase and the W phase are accordingly provided at positions lower than coil ends 86 that are the height direction end portions of the plural wound portions 74 (the end portions on the side where the coupling portions 68 are positioned).

Next, explanation follows regarding a manufacturing method of the armature 10.

Figure 15:
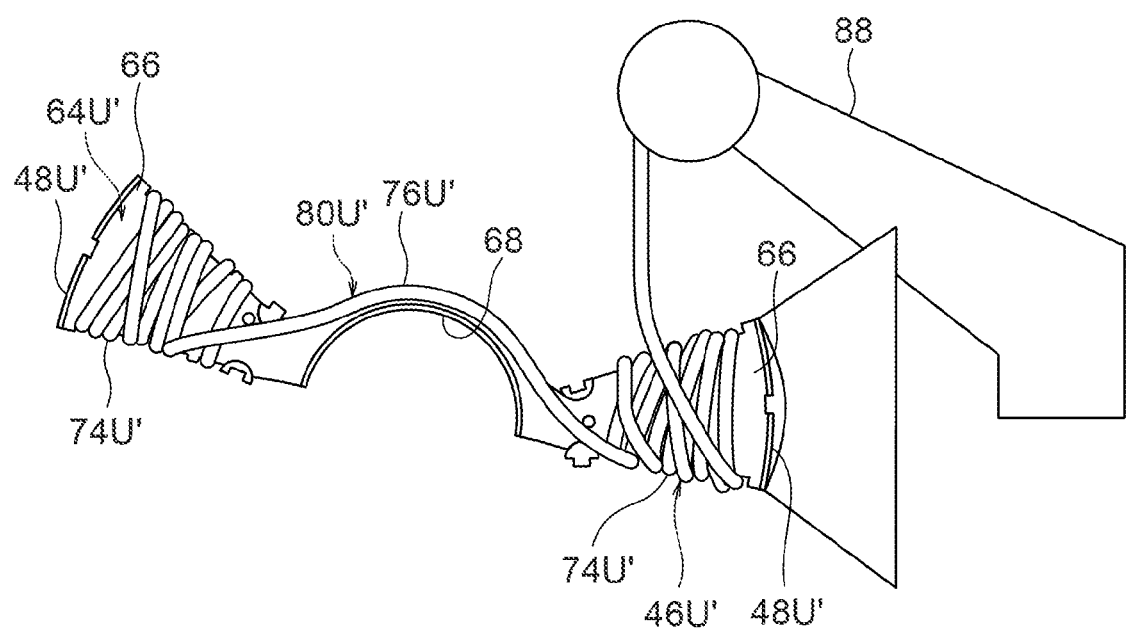
FIG. 15 is a plan view illustrating how a coil wire is wound on in an armature configuration unit according to the present exemplary embodiment.
Figure 16:
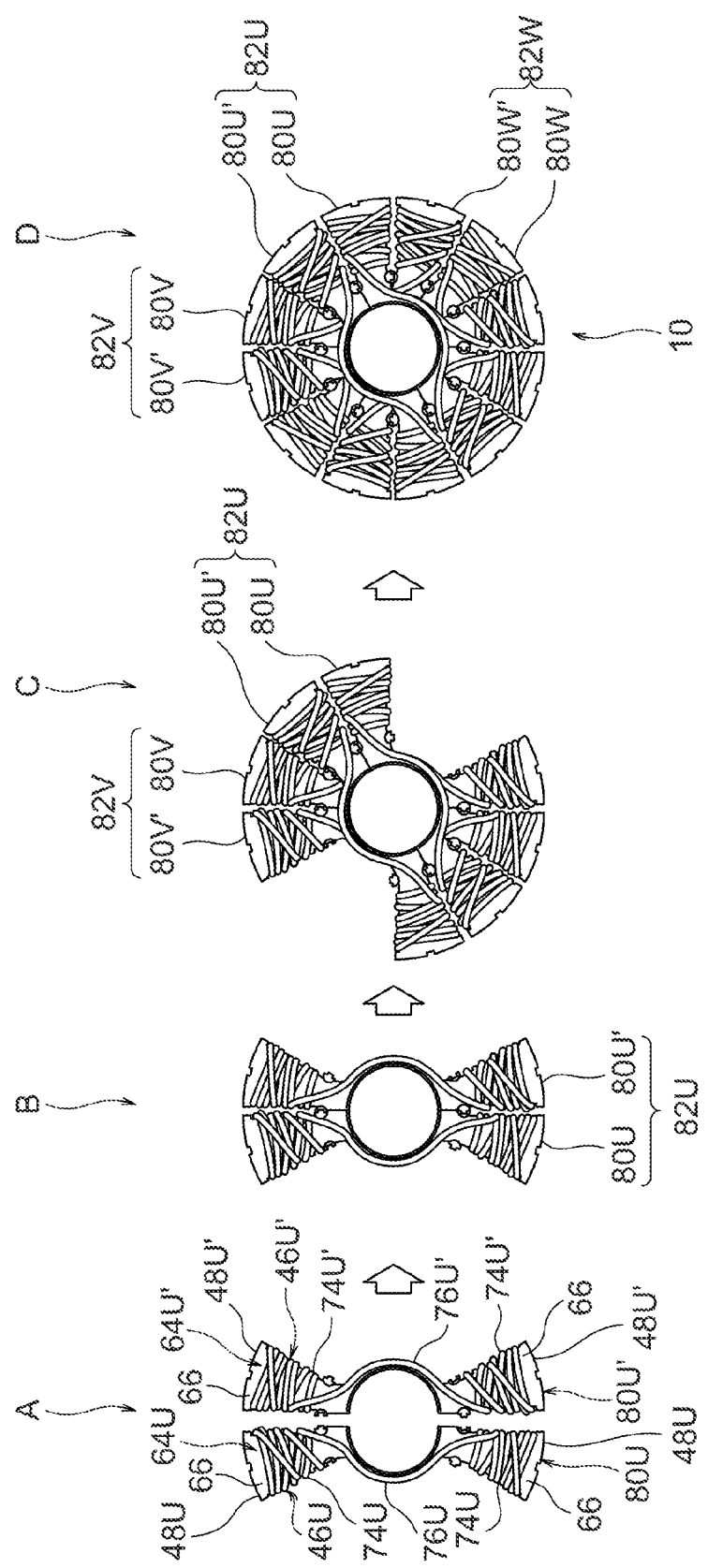
FIG. 16 is a drawing to explain an assembly sequence of an armature according to the present exemplary embodiment.

First, as illustrated by Process A in FIG. 16, the armature configuration unit 80U is prepared by assembling the pair of core configuration members 48U to the insulation portions 66 of the insulator 64U, and winding the coil wire 46U onto the pair of core configuration members 48U with the insulation portions 66 interposed therebetween. When this is performed, the coil wires 46U are wound using a winding machine 88 (see FIG. 15). The armature configuration unit 80U is accordingly formed with the pair of wound portions 74U wound onto the core configuration members 48U with the insulation portions 66 interposed therebetween, and the crossing wire 76U connecting together the pair of wound portions 74U.

Similarly, as illustrated by Process A in FIG. 16, the armature configuration unit 80U' is prepared by assembling the pair of core configuration members 48U' to the insulation portions 66 of the insulator 64U', and winding the coil wires 46U' onto the pair of core configuration members 48U' with the insulation portions 66 interposed therebetween. The armature configuration units 80V to 80W' are assembled similarly to the armature configuration units 80U, 80U' (the process described above is called as armature configuration unit assembly process).

Then, as illustrated by Process B in FIG. 16, the armature configuration units 80U, 80U' are combined together to assemble the armature configuration section 82U. When this is performed, the engaging portion 56 and the engaged portion 58 respectively provided to the armature configuration units 80U, 80U' are engaged with one another, thereby coupling together the armature configuration units 80U, 80U'. Similarly, the armature configuration units 80V, 80V' are combined together to assemble the armature configuration section 82V, and the armature configuration units 80W, 80W' are combined together to assemble the armature configuration section 82W (the process described above is called as armature configuration section assembly process).

Then, as illustrated by Process C in FIG. 16, the armature configuration section 82U is assembled to the armature configuration section 82V along the axial direction. As illustrated by Process D in FIG. 16, the armature configuration section 82W is assembled to the armature configuration sections 82U, 82V along the axial direction. The assembly sequence of the plural armature configuration sections 82U to 82W may be varied as appropriate (for example, the U phase may be assembled after assembling the V phase and the W phase). The armature 10 is thereby prepared by assembling the plural armature configuration sections 82U to 82W together along the axial direction. When this is performed, the adjacent engaging portions 56 and engaged portions 58 in the circumferential direction of the armature 10 (see FIG. 4, etc.) engage with each other, thereby coupling together the plural armature configuration sections 82U to 82W (the process described above is called as armature assembly process). The armature 10 is thus completed in the above manner.

Note that the thus assembled armature 10 is assembled with other members including the rotor 12, the centerpiece 14, the motor holder 16, the circuit board 18, the case 20, and the rotation shaft 30, illustrated in FIG. 1, in an appropriate sequence.

When this is performed, the shaft section 22 (press-fit member) of the centerpiece 14 is press-fitted inside the armature core 42 configured by the plural core configuration members 48U to 48W' coupled together in a ring shape (see FIG. 1, FIG. 5). As illustrated in FIG. 5, the engaging portions 56 and the engaged portions 58 are thereby pulled in the circumferential direction of the armature core 42, to give a state in which the armature core 42 is spread out to the radial direction outside (the process described above is called as press-fitting process). The rotating electrical device M is thus completed in the above manner.

Explanation follows regarding operation and advantageous effects of the present invention.

Note that in the following explanation regarding operation and advantageous effects, when no distinction is made between the U phase, the V phase and the W phase, the letters U, U', V, V', W, W' are dropped from the end of the reference numerals in the drawings. When distinction is made between the U phase, the V phase and the W phase, the letters U, U', V, V', W, W' are appended to the reference numerals.

Figure 31:
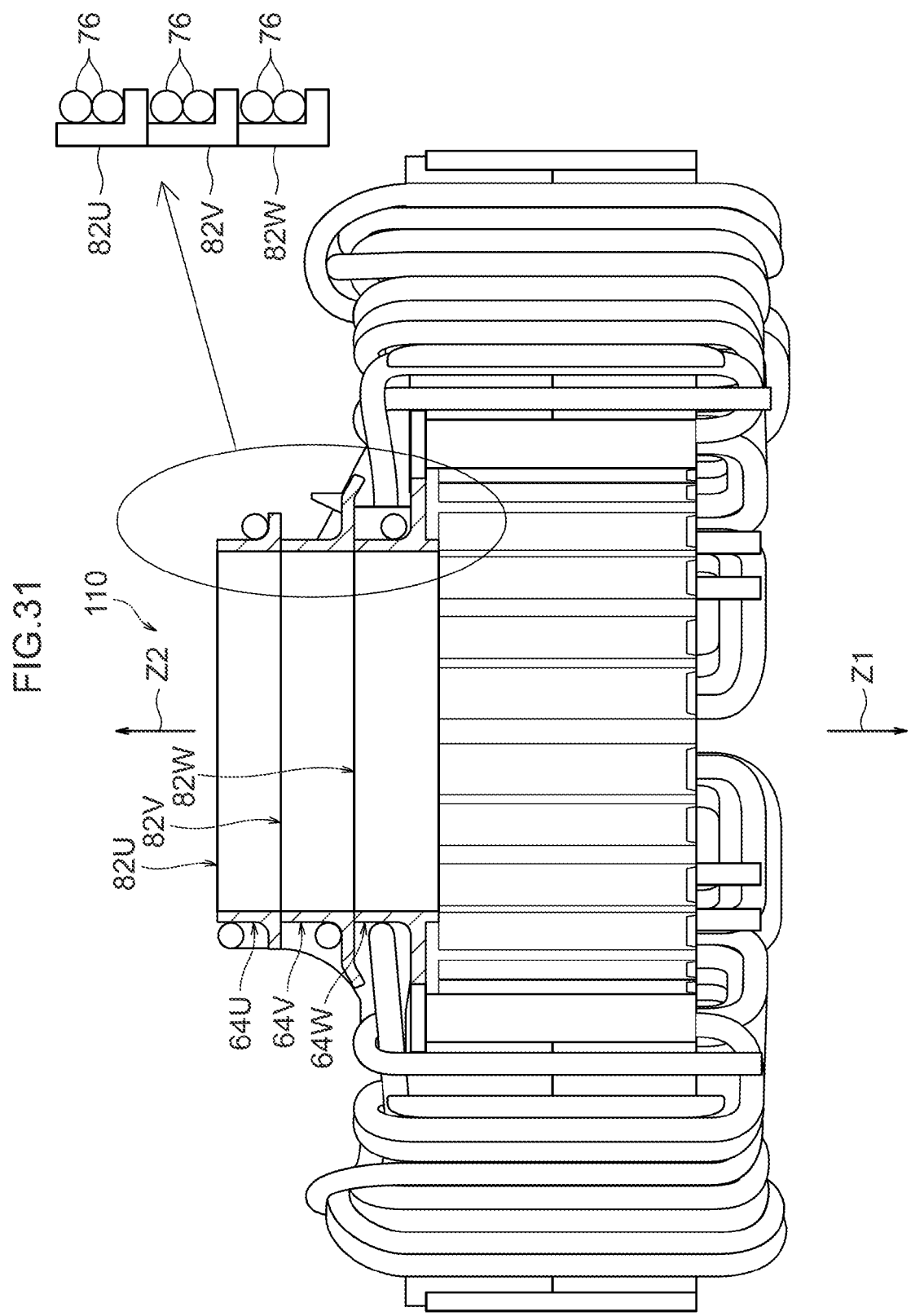
FIG. 31 is a vertical cross-section of an armature of a Comparative Example.
Figure 32:
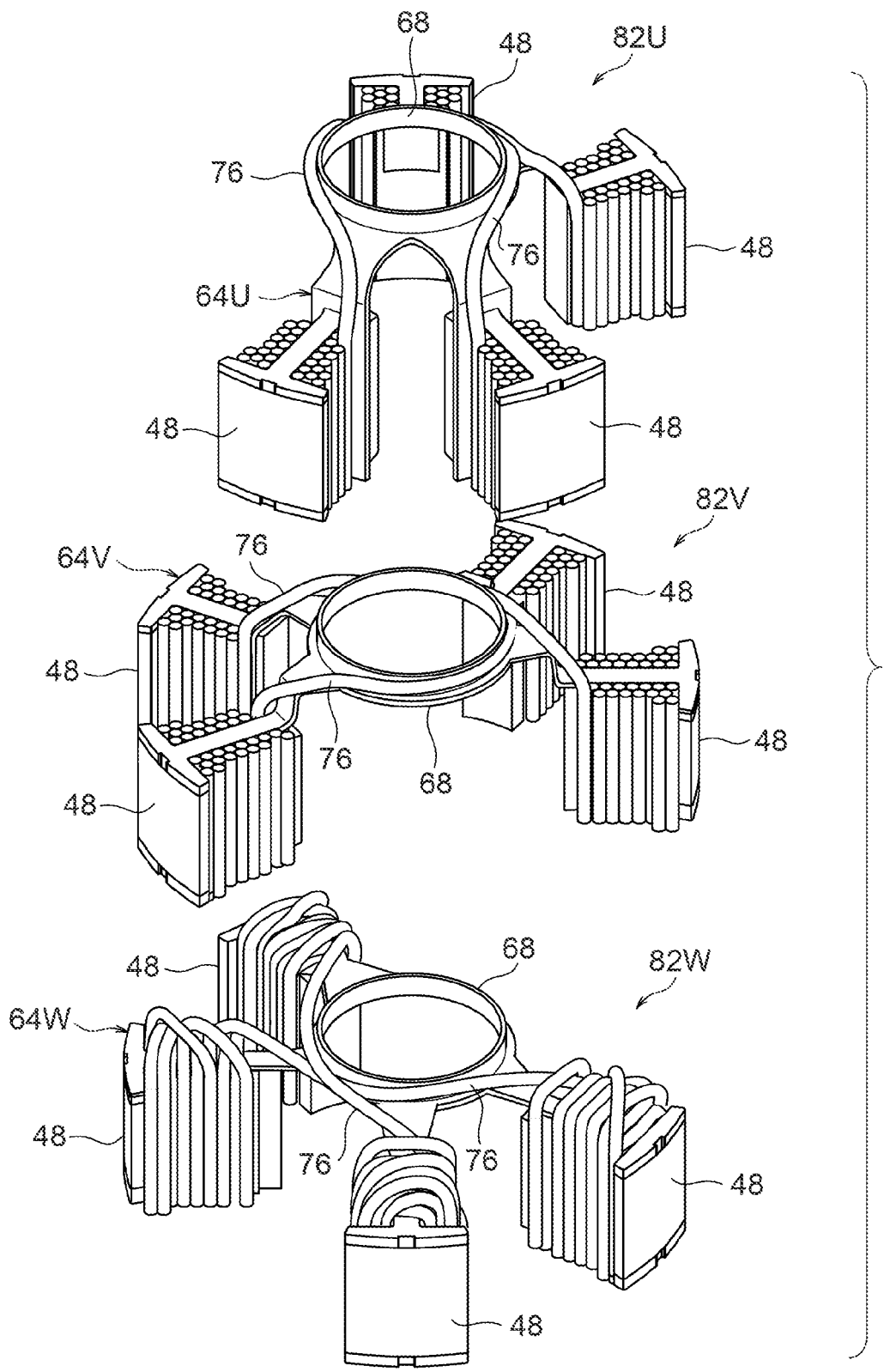
FIG. 32 is an exploded perspective view of the armature illustrated in FIG. 31.

Explanation is first given regarding a Comparative Example, before proceeding to explanation of the operation and advantageous effects of the present invention. FIG. 31 and FIG. 32 illustrate a Comparative Example. An armature 110 of the Comparative Example is configured by a ten pole twelve slot armature (or a fourteen pole twelve slot armature), and as illustrated in FIG. 32, is configured by three armature configuration sections 82U to 82W. Each of the armature configuration sections 82U to 82W includes one insulator 64U to 64W. The insulators 64U to 64W are each formed with a coupling portion 68, and each of the coupling portions 68 is formed in a ring shape.

Each of the armature configuration sections 82U to 82W is provided with core configuration members 48 at irregular intervals, with the narrowest intervals being equivalent to a single core configuration member (a center angle of 30°). As illustrated in FIG. 31, a pair of crossing wires 76, disposed following the respective coupling portions 68, intersects with each other in each of the armature configuration sections 82U to 82W.

However, the following issues arise in the armature 110 of the Comparative Example.

(1) When the plural armature configuration sections 82U to 82W are assembled together, a thickness is formed equivalent to six of the crossing wires, increasing the axial length of the armature 110.

(2) Since the respective armature configuration sections 82U to 82W are not formed with point symmetry, the respective armature configuration sections 82U to 82W tilt, giving poor work efficiency when assembling the plural armature configuration sections 82U to 82W into a ring shape.

(3) There are locations present where the interval between adjacent core configuration members 48 corresponds to a single core configuration member (narrow locations), making winding of the coil wires difficult.

(4) Four engagement locations between adjacent core configuration members 48 are present during assembly of the armature configuration section 82U of the uppermost layer to the armature configuration section 82V of the intermediate layer, and eight engagement locations between adjacent core configuration members 48 are present during assembly of the armature configuration section 82W of the lowermost layer to the armature configuration sections 82U, 82V of the uppermost layer and the intermediate layer. There are therefore a total of 12 engagement locations between adjacent core configuration members 48 present during assembly of the armature 110, making efficient assembly to be difficult.

In contrast, the operation and advantageous effects of the armature 10 of the present exemplary embodiment exhibit the following advantages over the armature 110 of the Comparative Example.

(1) According to the armature 10 of the present exemplary embodiment, as illustrated in FIG. 6 to FIG. 8, the pairs of core configuration members 48 are assembled to each of the plural insulators 64U to 64W', and the coil wires 46 are wound onto the pairs of core configuration members 48, thereby configuring six sets of the plural, mutually independent armature configuration units 80U to 80W'. The plural armature configuration units 80U to 80W' are combined so as to be adjacent to each other around the circumferential direction, thus configuring the plural armature configuration sections 82U to 82W.

The six sets of armature configuration sections 82U to 82W are disposed such that the pairs of crossing wires 76 follow the respective pairs of the coupling portions 68, with one of the coupling portions 68 and one of the crossing wires 76 separated from the other of the coupling portions 68 and the other of the crossing wires 76 to the one side and the other side of the axial center portion in the respective armature configuration sections 82U to 82W. Since the pairs of crossing wires 76 on each of the armature configuration sections 82U to 82W do not intersect with each other, even when the plural armature configuration sections 82U to 82W are assembled together to configure the armature 10, a thickness is formed substantially equivalent to three crossing wires layered in the axial direction, suppressing an increase in the axial length of the armature 10. The armature 10 can accordingly be configured with a shorter axial length than in a case in which the respective pairs of crossing wires 76 intersect with each other in each of the armature configuration sections 82U to 82W, such as in the Comparative Example described above.

(2) In each of the armature configuration sections 82U to 82W, the pairs of insulators 64 are formed symmetrically about a plane. Design and manufacture of the insulators 64 is accordingly straightforward, and good balance is enabled when the pairs of insulators 64 (the pairs of armature configuration units 80) are combined together. Each of the armature configuration sections 82U to 82W has point symmetry, enabling tilting of the armature configuration sections 82U to 82W to be suppressed, and enabling good work efficiency during assembly of the plural armature configuration sections 82U to 82W into a ring shape.

(3) In the respective armature configuration units 80U to 80W, the pairs of core configuration members 48 are disposed so as to leave gaps equivalent to a length of four of the core configuration members in the circumferential direction of the armature core. Space can therefore be secured at the peripheries of the core configuration members 48, enabling the winding machine to be suppressed from impinging on other core configuration members 48 when using the winding machine to wind the coil wires 46 onto the respective core configuration members 48 of the armature configuration units 80U to 80W. An improvement in work efficiency during coil winding is thereby enabled.

(4) Two engagement locations between adjacent core configuration members 48 are present during assembly of the armature configuration section 82U of the uppermost layer to the armature configuration section 82V of the intermediate layer, and four engagement locations are present during assembly of the armature configuration section 82W of the lowermost layer to the armature configuration sections 82U, 82V of the uppermost layer and the intermediate layer. There are therefore a total of six engagement locations between adjacent core configuration members 48 present during assembly of the armature 10, enabling efficient assembly to be achieved.

The operation and advantageous effects of the armature 10 of the present exemplary embodiment accordingly exhibit the above advantages over the armature 110 of the Comparative Example. In addition to the above, the present exemplary embodiment also exhibits the following operation and advantageous effects.

Namely, as illustrated in FIG. 4, in the armature 10 of the present exemplary embodiment, each of the plural core configuration members 48 is provided with an engaging portion 56 and an engaged portion 58, and the plural core configuration members 48 are coupled together in a ring shape by engagement of the adjacent engaging portions 56 and engaged portions 58 in the circumferential direction. The adjacent engaging portions 56 and engaged portions 58 thereby enable rattling of the plural core configuration members 48 coupled in a ring shape to be suppressed.

Moreover, as illustrated in FIG. 8, the guide projections 78 are provided to the portions of the insulators 64 connecting between the insulation portions 66 and the coupling portions 68, and the end portion of each of the crossing wires 76U is guided by each of the guide projection 78, and is placed between the engaging portion 56 and the engaged portion 58 formed at both sides of each the core configuration members 48. Each of the crossing wires 76 can accordingly be suppressed from becoming caught between circumferential direction adjacent engaging portions 56 and the engaged portions 58, even during engagement of the circumferential direction adjacent engaging portions 56 and engaged portions 58 to couple together the circumferential direction adjacent core configuration members 48.

The crossing wires 76 pass to the inside of the inner radial portions of the plural core configuration members 48 (see FIG. 2). This also enables the crossing wires 76 to be suppressed from becoming caught between adjacent engaging portions 56 and engaged portions 58 during coupling together of the adjacent core configuration members 48 in the circumferential direction.

Moreover, the respective pairs of coupling portions 68 in each of the armature configuration sections 82U to 82W each form a ring shape (see FIG. 6). Rattling of the pairs of coupling portions 68 can accordingly be suppressed, enabling the crossing wires 76 following the coupling portions 68 to be retained stably.

The coupling portions 68 form a circular arc shape following the inner radial portions of the plural core configuration members 48. The circular arc shaped coupling portions 68 enable the crossing wires 76 to be smoothly laid out from one to the other of the pair of core configuration members 48.

The coupling portions 68 include the guide portions 70 that support the crossing wires 76 from the radial direction inside of the coupling portions 68, and the restriction portions 72 that support the crossing wires 76 from the one axial direction side of the armature 10 (see FIG. 2). Deformation of the crossing wire 76 toward the radial direction inside of the coupling portions 68 and to the one axial direction side of the armature 10 can accordingly be suppressed. This enables the crossing wires 76 following the coupling portions 68 to be retained even more stably.

As illustrated in FIG. 6, the wound portions 74 have been wound in a tightening direction on each of the armature configuration units 80U to 80W'. Loosening of the wound portions 74 can accordingly be suppressed, and the intensive winding of the wound portions 74 can be enhanced.

As illustrated in FIG. 2, the crossing wires 76V, 76V' of the armature configuration section 82V of the intermediate layer are disposed between the U phase coupling portions 68 and the W phase coupling portions 68. Since the crossing wires 76V, 76V' of the intermediate layer can be interposed between the U phase coupling portions 68 and the W phase coupling portions 68 in the layers above and below, the crossing wires 76V, 76V' of the intermediate layer can be suppressed from lifting up.

The V phase and W phase coupling portions 68 of the intermediate layer and the lowermost layer are disposed within the height of the plural wound portions 74U to 74W' in the armature 10 axial direction. The V phase and W phase coupling portions 68 of the intermediate layer and the lowermost layer are moreover provided at positions lower than the end portions (coil ends 86) positioned on an axial direction end side of the armature 10 out of the plural wound portions 74U to 74W'. The projection amount of the plural coupling portions 68 in the armature 10 axial direction can accordingly be suppressed, thereby enabling a shorter axial length of the armature 10.

The insulation portions 66 and the coupling portions 68 are integrally formed in each of the insulators 64U to 64W', enabling a reduction in the number of components.

As described above, in each of the plural armature configuration sections 82U to 82W, the one coupling portion 68 and the one crossing wire 76, and the other coupling portion 68 and the other crossing wire 76, are provided so as to separate to one side and the other side of the respective axial center portions 83 of the armature configuration section 82U to 82W. This accordingly enables the center of gravity to be suppressed from becoming unbalanced toward one side in the respective armature configuration sections 82U to 82W.

Out of the plural coil wires 46U to 46W', the terminal end portions 84 of the coil wires 46 of the same phase are disposed within the same slot 49 out of the plural slots 49 formed between the plural core configuration members 48U to 48W', enabling the terminal end portions 84 of the coil wires 46 of the same phase to be connected together easily.

The terminal end portions 84 of the plural coil wires 46U to 46W' are disposed on the opposite side of the plural armature configuration units 80U to 80W' to the side of the coupling portions 68 in the axial direction, such that counterpart members for connecting to the terminal end portions 84 of the plural coil wires 46U to 46W' and the coupling portions 68 are disposed on mutually opposite sides. This enables the axial length of the armature 10 to be made shorter than when, for example, the coupling portions 68 and the counterpart members are disposed on the same side.

The rotating electrical device M of the present exemplary embodiment includes the armature 10 described above, enabling the overall axial length of the rotating electrical device M to be made shorter.

As illustrated in FIG. 15 and FIG. 16, in the armature 10 manufacturing method according to the present exemplary embodiment, the coil wires 46 are wound onto the pairs of core configuration members 48 in a separated state of the plural, mutually independent armature configuration units 80U to 80W'. Space can accordingly be secured at the periphery of the core configuration members 48 when using the winding machine 88 to wind the coil wires 46 onto the core configuration members 48. The winding machine 88 can accordingly be suppressed from impinging on other core configuration members 48 when using the winding machine 88 to wind the coil wires 46 onto one of the core configuration members 48 of the armature configuration units 80U to 80W', thereby enabling an improvement in work efficiency during coil winding.

According to the manufacturing method of the rotating electrical device M of the present exemplary embodiment, the circumferential direction adjacent engaging portions 56 and engaged portions 58 are fitted together with play therebetween in the armature configuration section assembly process and the armature assembly process (see the top drawing in FIG. 5), thereby enabling easy coupling of the circumferential direction adjacent armature configuration units out of the plural armature configuration units 80U to 80W'. The shaft section 22 of the centerpiece 14 is then press-fitted inside the armature core 42 configured by the plural core configuration members 48U to 48W' coupled in a ring shape (see the bottom drawing in FIG. 5), to give a state in which the armature core 42 is spread toward the radial direction outside, thereby enabling rattling of the armature core 42 to be suppressed.

Explanation follows regarding modified examples of the present exemplary embodiment.

First Modified Example

In the armature configuration unit assembly process described above, the insulator 64U and insulator 64U' of the U phase, the insulator 64V and insulator 64V' of the V phase, and the insulator 64W and insulator 64W' of the W phase are respectively configured as separate members. However, in the armature configuration unit assembly process, molded members 92, illustrated in FIG. 17, may be employed for the U phase insulators 64U and 64U', the V phase insulators 64V and 64V', and the W phase insulators 64W and 64W' described above.

Figure 17:
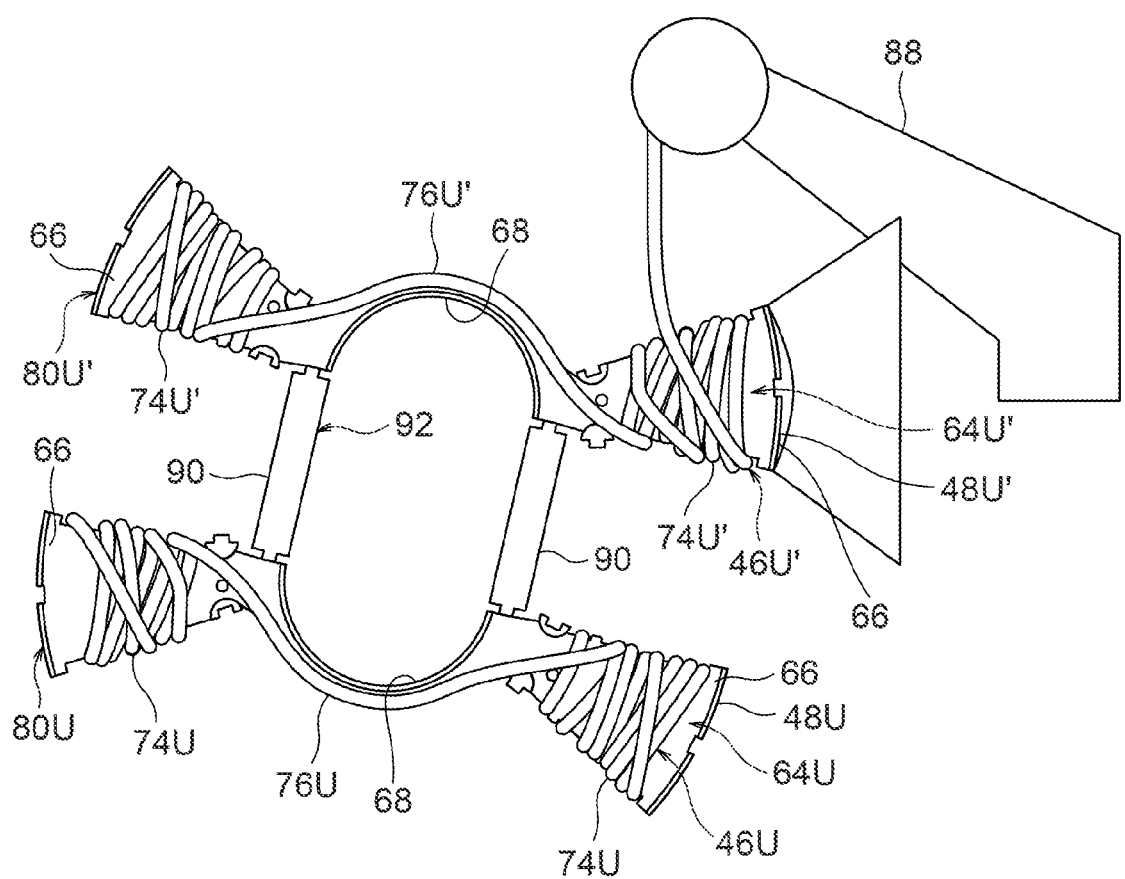
FIG. 17 is a plan view illustrating how a coil wire is wound on in an armature configuration unit according to a first modified example.

Namely, for example when the molded member 92 illustrated in FIG. 17 is employed in the U phase, the molded member 92 is integrally provided with a pair of insulators 64U, 64U', and a pair of connector portions 90 (runner portions) connecting together the pair of insulators 64U, 64U'. Although not specifically illustrated, molded members for the V phase and the W phase are of similar configuration.

Figure 18:
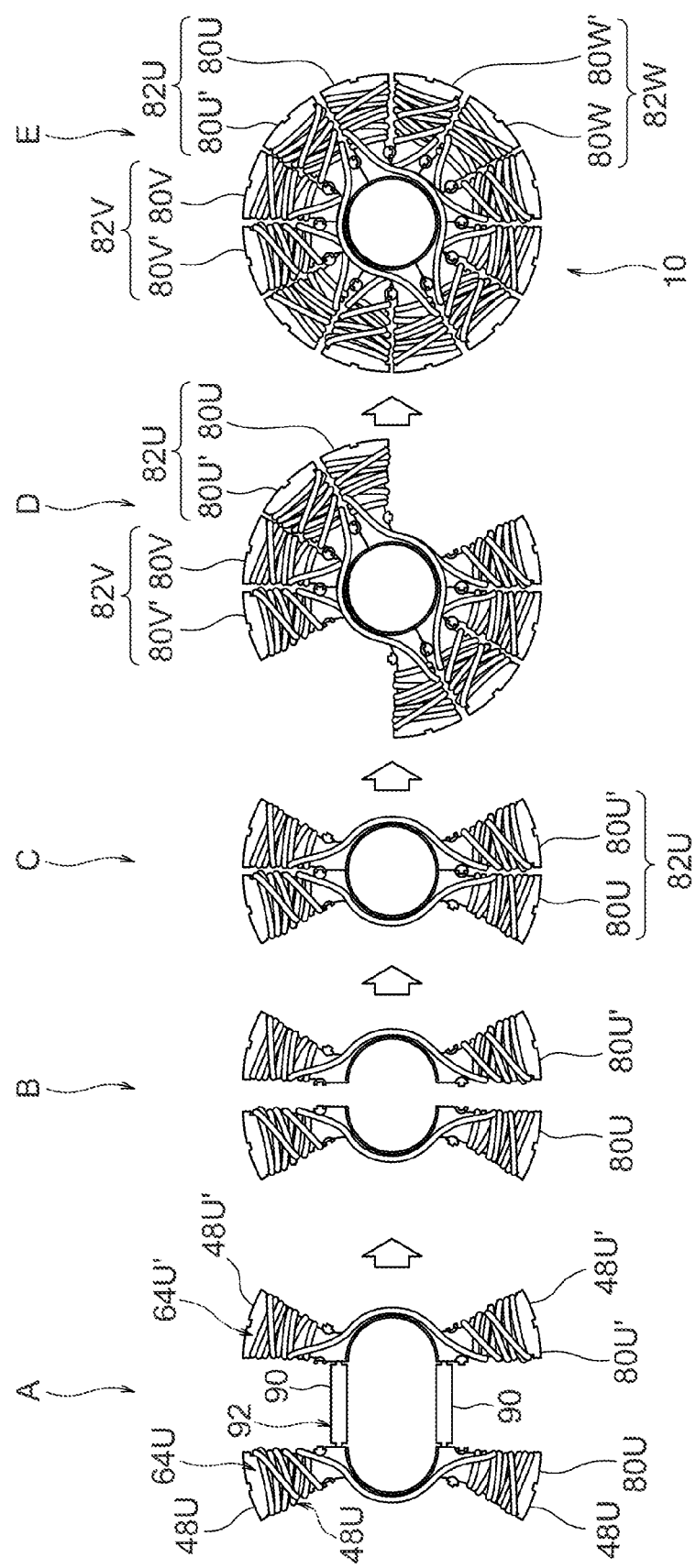
FIG. 18 is a drawing to explain an assembly sequence of an armature according to the first modified example.

In the first modified example, as illustrated by Process A in FIG. 18, the pair of insulators 64U, 64U' are respectively assembled to the pair of core configuration members 48U and the pair of core configuration members 48U' in the connected state of the pair of insulators 64U, 64U' by the pair of connector portions 90. The coil wires 46U are wound onto the pair of core configuration members 48U and the pair of core configuration members 48U'.

Figure 19:
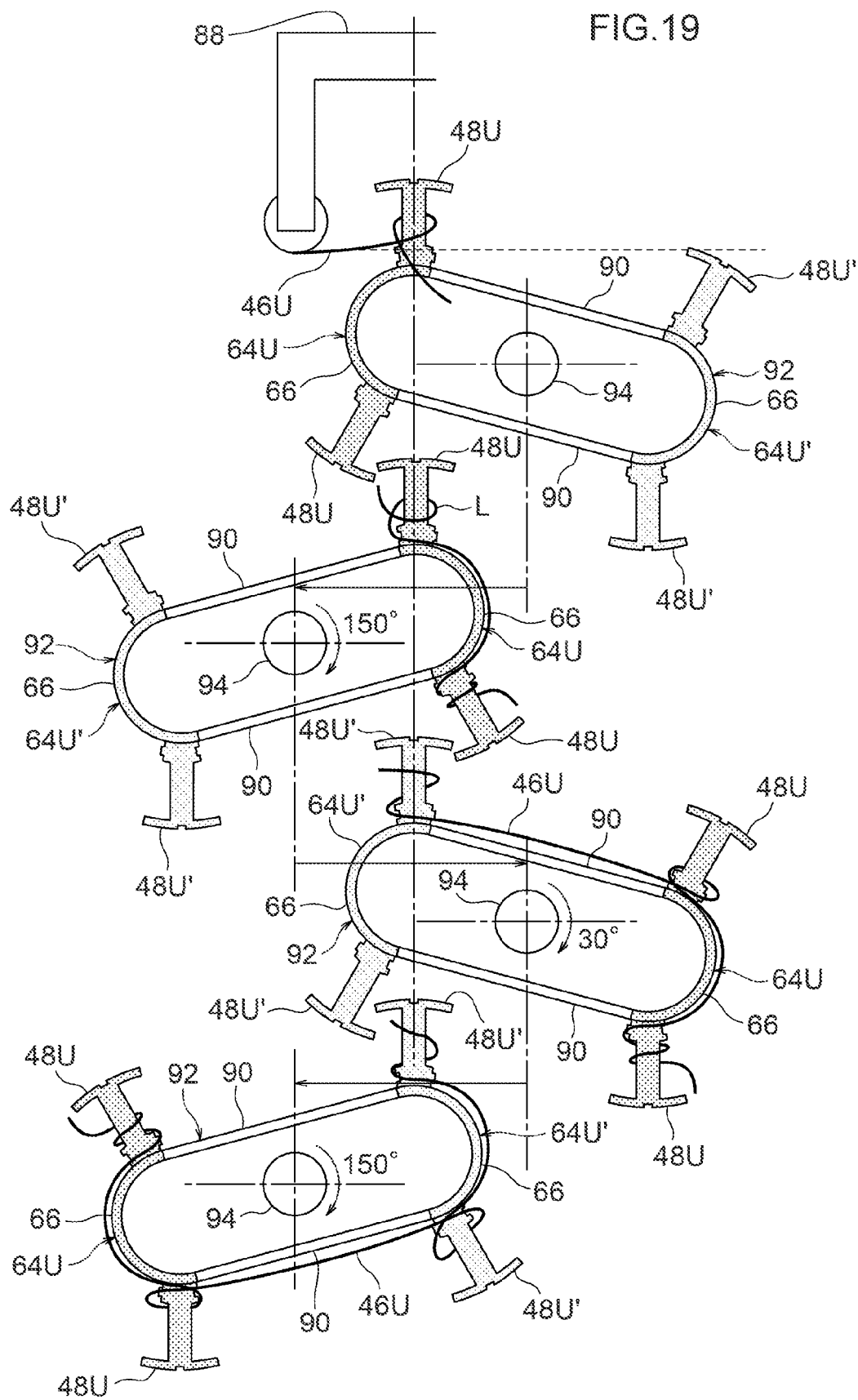
FIG. 19 is a drawing to explain a sequence in which a coil wire is wound on in an armature configuration unit according to the first modified example.

When this is performed, as illustrated in FIG. 19, the coil wire 46U is wound onto the pair of core configuration members 48U assembled to the one insulator 64U, and then the coil wire 46U goes on to be wound on to the pair of core configuration members 48U' assembled to the other insulator 64U', without cutting the coil wire 46U. The molded member 92 is mounted on a dedicated jig, and the coil wire 46U is wound on while rotating the molded member 92 in one direction about an axial center portion 94 of the jig, through a specific angle each time (for example, alternating angles of 150° and 30°). The connector portions 90 are secured with sufficient length that the winding machine 88, the coupling portions 68, and the core configuration members 48U, 48U' do not impinge on one another during coil winding of the coil wire 46.

As illustrated by Process B to Process C in FIG. 18, in the armature configuration section assembly process, the armature configuration section 82U is assembled by combining the circumferential direction adjacent armature configuration units 80U, 80U' in a state in which the connector portions 90 have been removed. Although not specifically illustrated, the armature configuration sections 82V, 82W are of similar configuration.

According to the first modified example, employing the molded member 92 that is integrally provided with the pair of insulators 64U, 64U', and the connector portions 90 connecting together the pair of insulators 64U, 64U' of the U phase (and similarly for the V phase and the W phase) enables an reduction in the number of components and a reduction in the number of processes during manufacture of the armature 10.

Figure 20A:
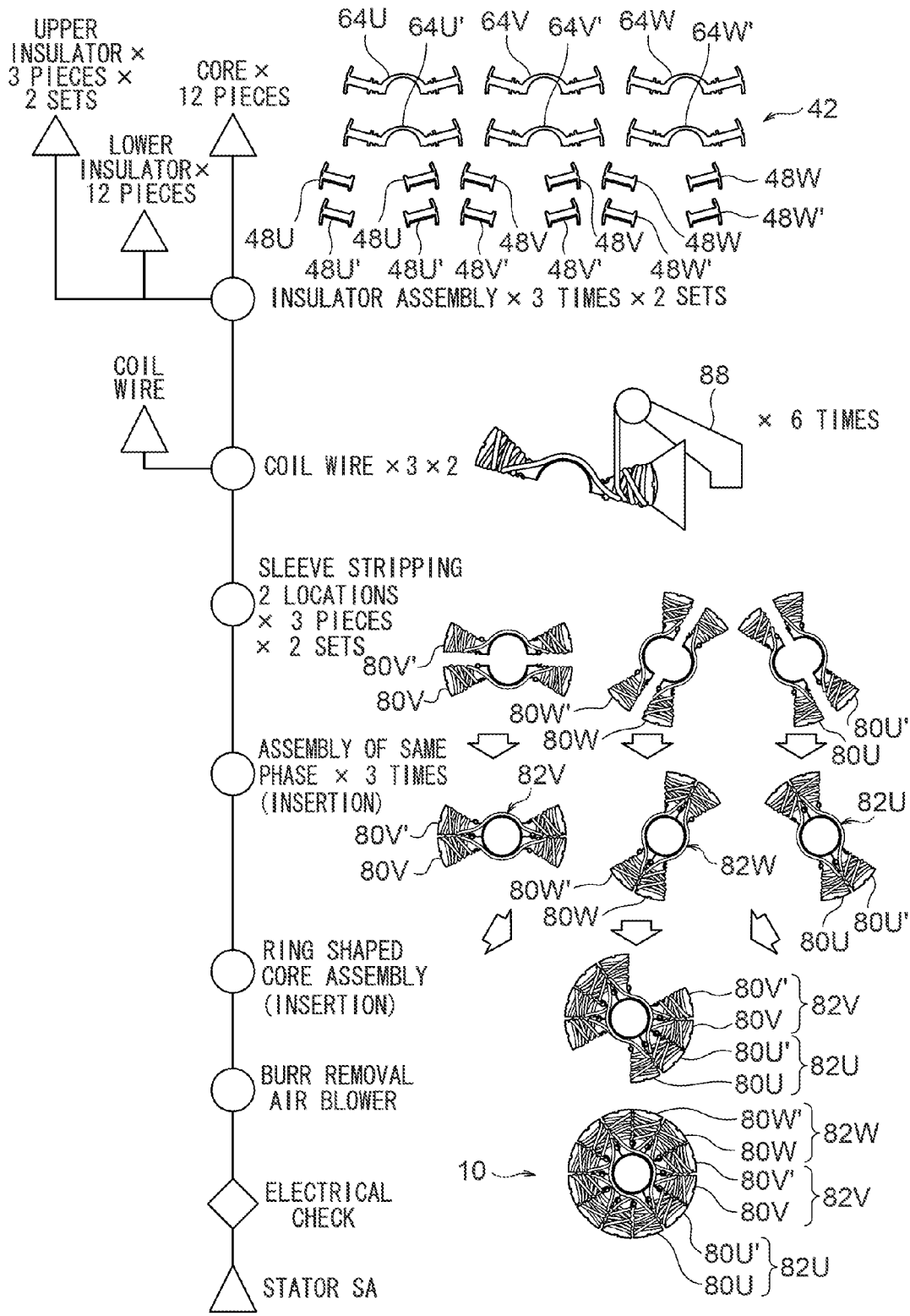
FIG. 20A is an explanatory drawing to compare manufacturing processes in the first modified example and the present exemplary embodiment.
Figure 20B:
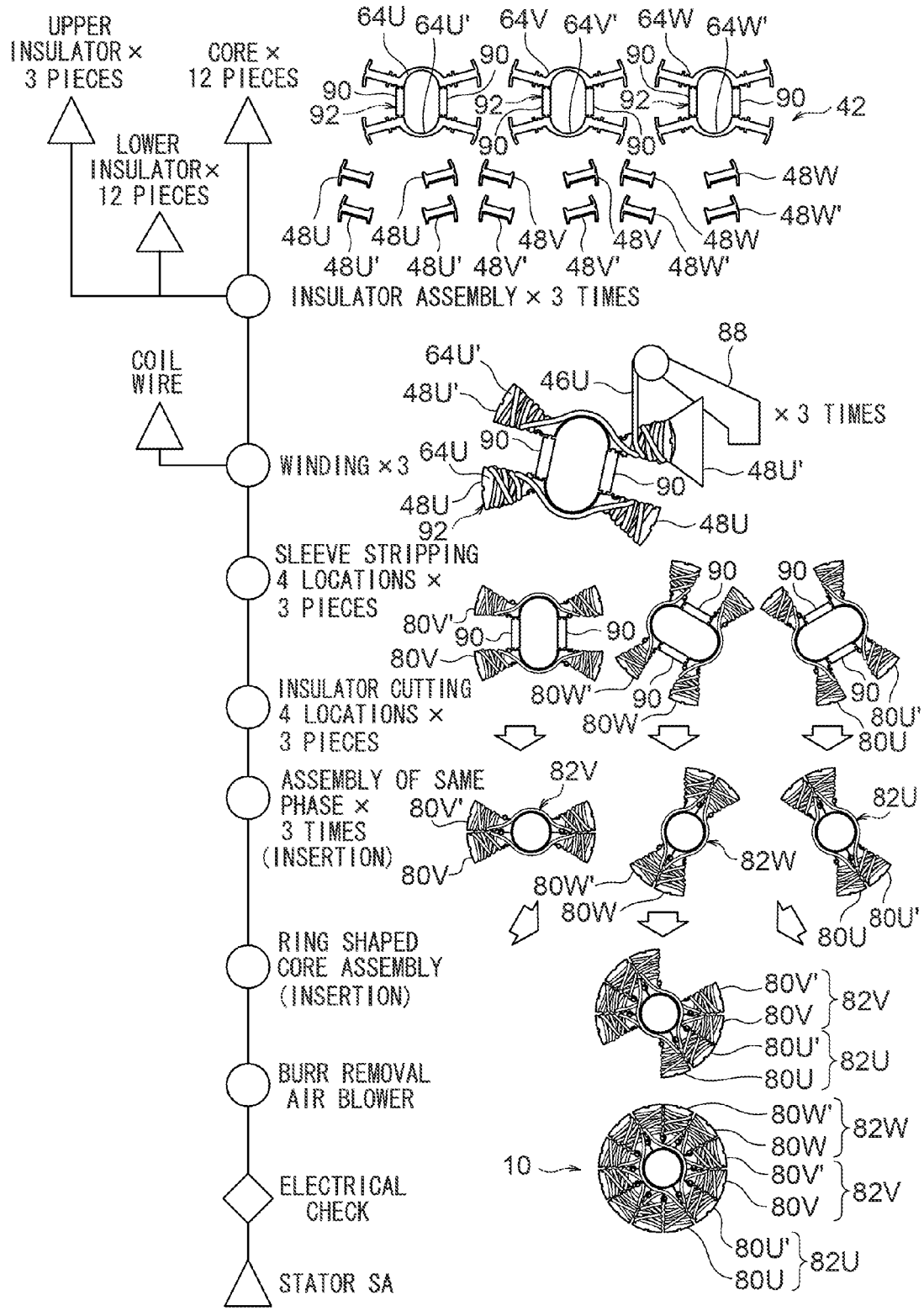
FIG. 20B is an explanatory drawing to compare manufacturing processes in the first modified example and the present exemplary embodiment.

FIG. 20A and FIG. 20B illustrate a comparison between the manufacturing processes of the present exemplary embodiment and the first modified example. FIG. 20A illustrates the manufacturing process of the present exemplary embodiment described above (FIG. 1 to FIG. 16), and FIG. 20B illustrates the manufacturing process of the first modified example (FIG. 17 to FIG. 19).

As illustrated in FIG. 20A, in the present exemplary embodiment described above, each of the insulators 64U to 64W' is configured by the upper insulator including upper portions of the pair of insulation portions 66 and the coupling portion 68 (see FIG. 6, for example), and a pair of lower insulators (not illustrated in the drawings) that form only the lower portions of the pair of insulation portions 66. The present exemplary embodiment includes six upper insulators, twelve lower insulators, and twelve of the core configuration members 48U to 48W', giving a total of thirty components in the armature core 42.

Moreover, in the present exemplary embodiment, there are six assembly operations of the plural insulators 64U to 64W' to the plural core configuration members 48U to 48W', six winding operations by the winding machine 88, two sets x three pieces=six sleeve stripping operations of the coil wire terminal end portions (at two locations each), three assembly operations of armature configuration units of the same phase out of the plural armature configuration units 80U to 80W', one armature assembly operation, one burr removal operation, and one electrical check, giving a total of 24 processes.

By contrast, as illustrated in FIG. 20B, in the first modified example described above, out of the respective insulators 64U to 64W', the insulators of the same phase are configured from the upper insulator configured from the molded member 92, and a pair of lower insulators (not illustrated in the drawings). In the first modified example, there are 3 upper insulators, 12 lower insulators, and 12 core configuration members 48U to 48W', giving a total of 27 components in the armature core 42.

Moreover, in the first modified example, there are three assembly operations of the plural insulators 64U to 64W' to the plural core configuration members 48U to 48W', three winding operations by the winding machine 88, three pieces=three sleeve stripping operations of the coil wire terminal end portions (at four locations each), three cutting operations (at four locations each) of the connector portions 90, three assembly operations of armature configuration units of the same phase out of the plural armature configuration units 80U to 80W', one armature assembly operation, one burr removal operation, and one electrical check, giving a total of 18 processes.

By employing the molded members 92 that include the connector portions 90 connecting together insulators of the same phase out of the plural insulators 64U to 64W' in the armature configuration unit assembly process, the first modified example accordingly enables a reduction in the number of components and a reduction in the number of processes during manufacture of the armature 10 compared to the present exemplary embodiment.

Taking the U phase as an example, after winding the coil wire 46U onto the pair of core configuration members 48U assembled to the one insulator 64U, the coil wire 46U is then wound onto the pair of core configuration members 48U' assembled to the other insulator 64U' without cutting, thereby enabling a reduction in processing costs incurred due to reconnecting the terminal end portions of the coil wires 46U (similar applies for the V phase and the W phase).

The coil wires can be easily wound onto the respective core configuration members 48U to 48W' while rotating the molded member 92, connected in a ring shape by the connector portions 90, about its axial center.

Second Modified Example

In the armature configuration unit assembly process described above, the molded member 92 according to the first modified example may be modified as follows. Namely, in the second modified example illustrated in FIG. 21, the molded member 92 is configured with a pair of upper insulators 96, including upper portions of a pair of insulation portions 66 and coupling portions 68, and a pair of lower insulators 98, forming only lower portions of the pair of insulation portions 66, with the upper insulators 96 and the lower insulators 98 connected together by connector portions 100 (runner portions).

Figure 21:
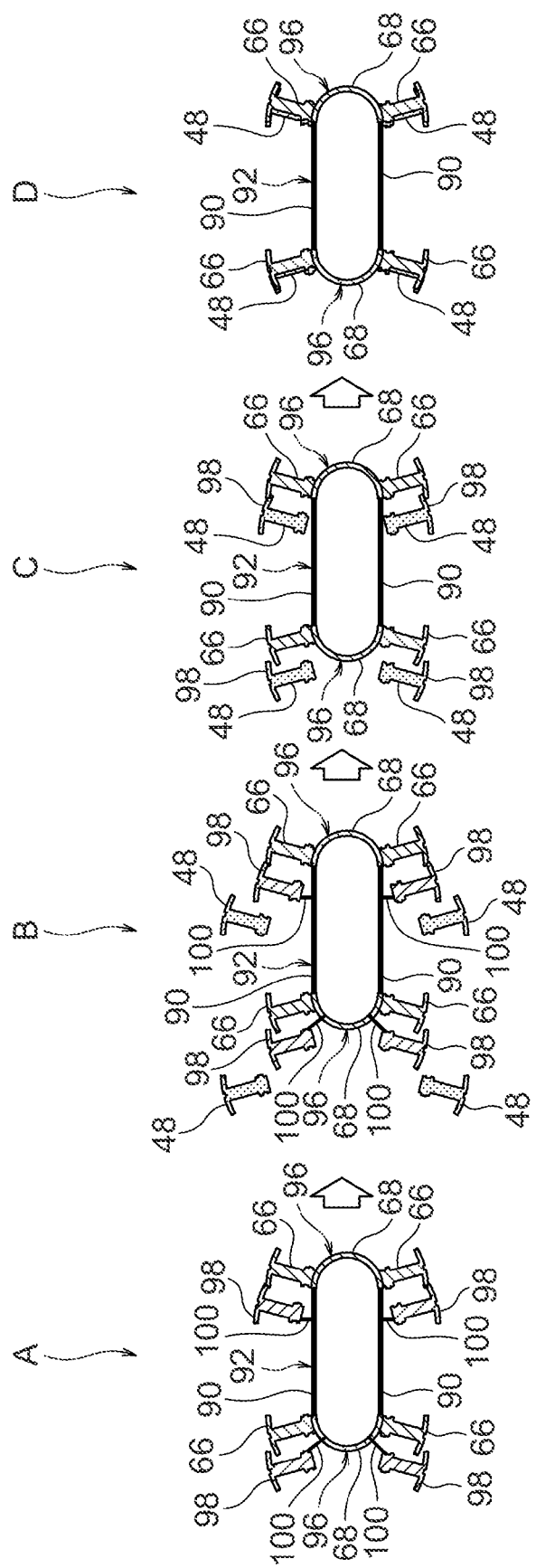
FIG. 21 is a drawing to explain an assembly sequence of an armature configuration unit according to a second modified example.

In the armature configuration unit assembly process according to the second modified example, first, as illustrated by Process A in FIG. 21, the molded member 92 is formed with the upper insulators 96 and the lower insulators 98 connected together by the connector portions 100 (runner portions). Next, as illustrated by Process B to Process C in FIG. 21, the core configuration members 48 are assembled to the lower insulators 98, and the connector portions 100 are cut, after which, as illustrated by Process D in FIG. 21, the core configuration members 48 assembled to the lower insulators 98 are assembled to the upper insulators 96.

According to the second modified example, the molded member 92 in which the upper insulators 96 and the lower insulators 98 are connected together by the connector portions 100 is employed in the armature configuration unit assembly process whereby a further reduction in the number of components in the manufacture of the armature 10.

Moreover, as illustrated in FIG. 21, a reduction in the number of processes in the armature configuration unit assembly process is also enabled, since the 4 core configuration members 48 can be assembled to the molded member 92 at the same time.

Third Modified Example

Figure 22:
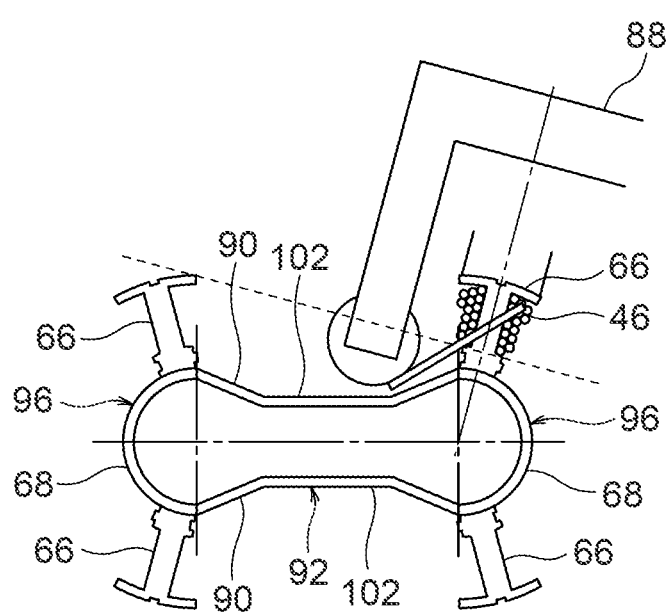
FIG. 22 is a plan view illustrating how a coil wire is wound on in an armature configuration unit according to a third modified example.

The molded member 92 according to the second modified example described above may be modified as follows. Namely, in the third modified example illustrated in FIG. 22, length direction central portions of a pair of connector portions 90 is configured with offset portions 102 that are offset so as to approach one another.

Due to forming the connector portions 90 with the offset portions 102, the third modified example enables the winding machine 88 to be suppressed from impinging on the connector portions 90 as the winding machine 88 draws out a winding end line of the coil wire 46.

Fourth Modified Example

In the above exemplary embodiment, as illustrated in FIG. 2, the plural coupling portions 68 are disposed in a row along the armature 10 axial direction. However, as illustrated in FIG. 23, the W phase coupling portions 68 of the lowermost layer, and the V phase coupling portions 68 of the intermediate layer, may be disposed in a row along the armature 10 radial direction, with the U phase coupling portions 68 of the uppermost layer and the V phase coupling portions 68 of the intermediate layer disposed in a row along the armature 10 axial direction.

Figure 23:
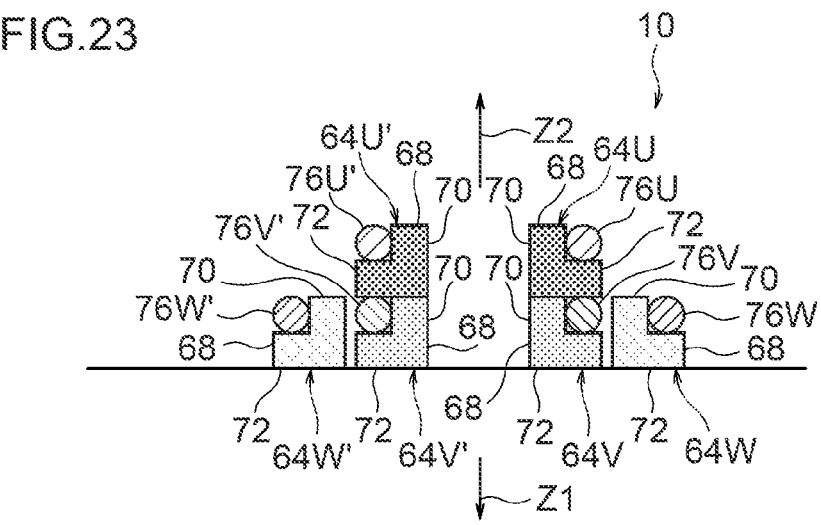
FIG. 23 is a vertical cross-section illustrating plural coupling portions according to a fourth modified example.
Figure 24:
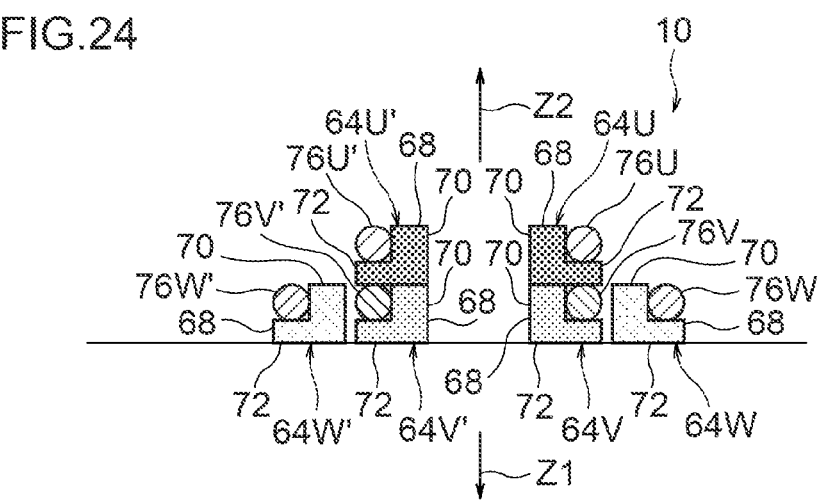
FIG. 24 is a vertical cross-section illustrating plural coupling portions according to the fourth modified example.

In such a configuration, the guide portions 70 and the restriction portions 72 of the coupling portions 68 may be formed with the same thickness as each other, as illustrated in FIG. 23. However, a shorter axial length of the armature 10 can be enabled by forming the restriction portions 72 thinner than the guide portions 70, as illustrated in FIG. 24. Moreover, a further reduction in the axial length of the armature 10 can be enabled by disposing the plural coupling portions 68 in a row in the armature 10 radial direction, as illustrated in FIG. 25.

Figure 25:
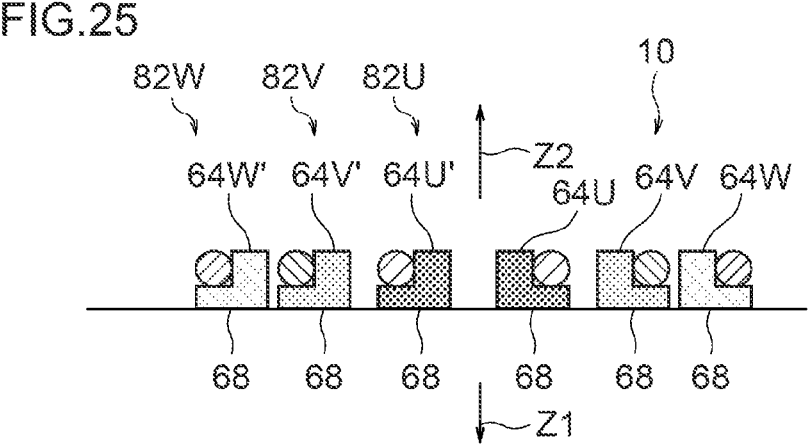
FIG. 25 is a vertical cross-section illustrating plural coupling portions according to the fourth modified example.

In the modified example illustrated in FIG. 25, the armature configuration section 82V, that has the coupling portion 68 with the second largest diameter, is assembled to the armature configuration section 82U, that has the coupling portion 68 with the smallest diameter, along the axial direction. Lastly, the armature configuration section 82W, that has the coupling portion 68 with the largest diameter, is assembled to the armature configuration sections 82U, 82V along the axial direction.

Other Modified Examples

Figure 26:
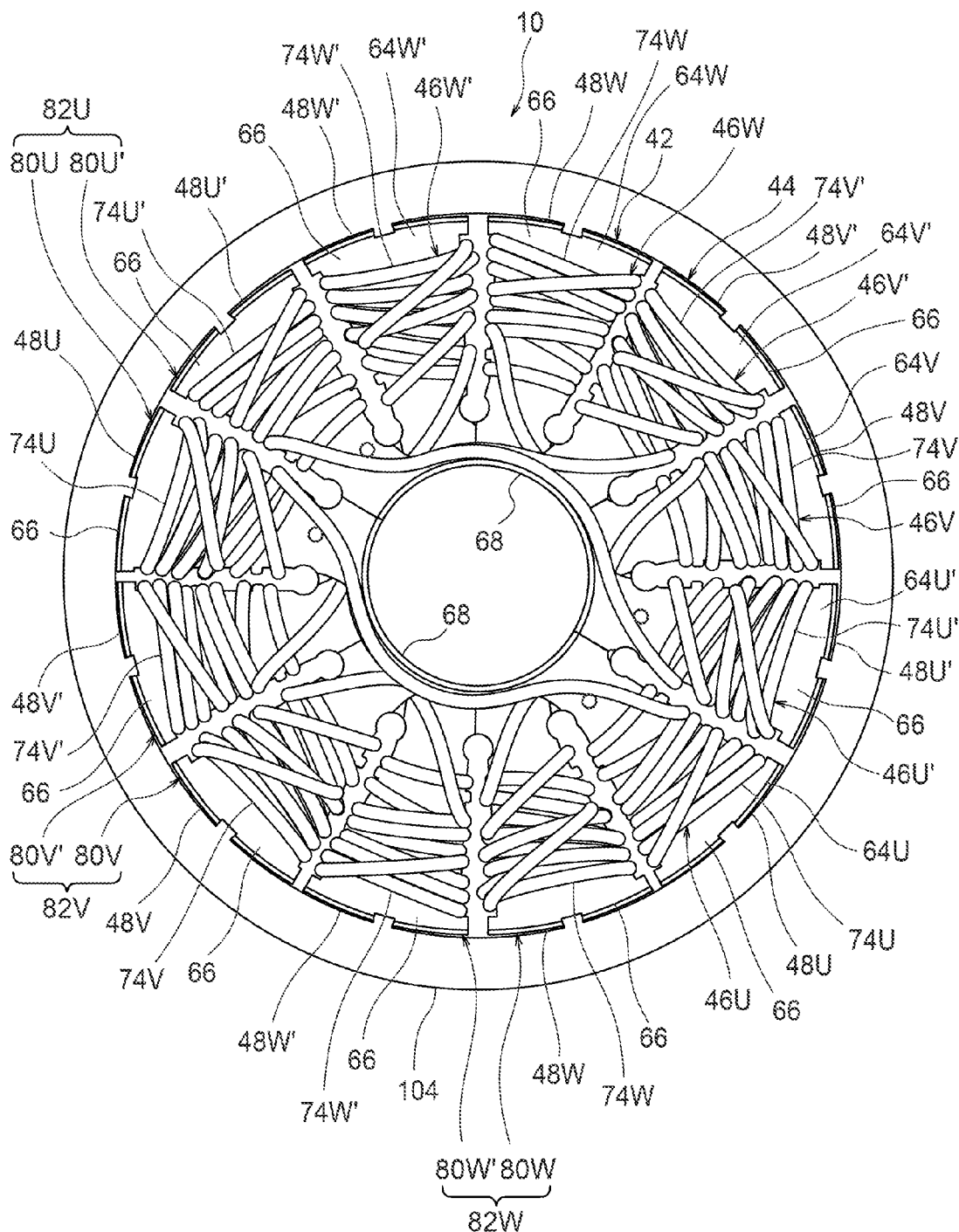
FIG. 26 is a plan view of an inner rotor type rotating electrical device according to a fifth modified example.

In the exemplary embodiment described above, the armature 10 is configured as the stator in an outer rotor type rotating electrical device; however, as illustrated in FIG. 26, the armature 10 may be configured as the stator in an inner rotor type rotating electrical device. When the armature 10 is configured as the stator in an inner rotor type rotating electrical device, a yoke ring 104 is provided at the radial direction outside of the armature 10.

Moreover, the armature 10 may be configured as the rotor in a brushed DC motor instead of as the stator in a brushless motor. Note that when the armature 10 is configured as the rotor in a brushed DC motor, a rotation shaft, serving as a press-fit member, is press-fitted inside the armature core 42 configured from the plural core configuration members 48U to 48W'.

The armature 10 includes the twelve core configuration members 48U to 48W', the six insulators 64U to 64W', and the plural coil wires 46U to 46W' configuring the U, V, and W phases, however the numbers thereof are not limited thereto. In such cases, a pair of the core configuration members may be disposed with a gap equivalent to a length of at least one of the core configuration members in the circumferential direction of the coupling portion 68 between respective core configuration members in the armature configuration units 80U to 80W'.

Out of the plural coupling portions 68, the V phase and the W phase coupling portions 68 of the intermediate layer and the lowermost layer are disposed within the height of the plural wound portions 74U to 74W' in the armature 10 axial direction. However, configuration may be made such that out of the plural coupling portions 68, only the W phase coupling portions 68 of the lowermost layer is disposed within the height of the plural wound portions 74U to 74W' in the armature 10 axial direction. Configuration may also be made such that all of the plural coupling portions 68 are disposed within the height of the plural wound portions 74U to 74W' in the armature 10 axial direction.

Moreover, a pair of the insulation portions 66 is provided to each of the insulators 64U to 64W' (2 each), however configuration may be made such that three or more of the insulation portions 66 are provided to each of the insulators 64U to 64W'.

The U phase insulator 64U and insulator 64U' are formed symmetrically about a plane as viewed along the armature 10 axial direction, however they need not be symmetrical about a plane. Similar applies for the V phase insulators 64V, V' and the W phase insulators 64W, W'.

Each of the plural core configuration members 48U to 48W' is provided with the engaging portion 56 and the engaged portion 58, and the plural core configuration members 48U to 48W' are coupled together by engagement of adjacent engaging portions 56 and engaged portions 58 with each other in the circumferential direction in the armature 10. However, each of the plural core configuration members 48U to 48W' may, for example, be independently connected to the centerpiece 14, without coupling in a ring shape.

All of the plural crossing wires 76U to 76W' pass further to the inside than the inner radial portions of the plural core configuration members 48; however, for example, the crossing wires 76U, 76U' of the U phase armature configuration section 82U of the uppermost layer may pass further to the outside than the inner radial portions of the plural core configuration members 48. Note that the crossing wires 76U, 76U' can still be suppressed from becoming caught between the circumferential direction adjacent engaging portions 56 and engaged portions 58, even when the crossing wires 76U, 76U' of the U phase armature configuration section 82U of the uppermost layer pass further to the outside than the inner radial portions of the plural core configuration members 48.

Each of the coupling portions 68 formed to each of the plural insulators 64U to 64W' are formed in a circular arc shape, however they may also be formed in shapes other than a circular arc shape.

Each of the wound portions 74U to 74W' have been wound in the tightening direction, however they may also be wound in a loosening direction.

Moreover, in each of the plural armature configuration sections 82U to 82W, the one coupling portion 68 and crossing wire 76 and the other coupling portion 68 and crossing wire 76 are provided so as to separate to one side (the arrow A side) and the other side (the arrow A' side) of the axial center portions 83 of the armature configuration sections 82U to 82W. However, in each of the plural armature configuration sections 82U to 82W, the one coupling portion 68 and crossing wire 76 and the other coupling portion 68 and crossing wire 76 may be disposed in any manner, as long as they are disposed side by side along a direction orthogonal to the axial direction of the armature configuration sections 82U to 82W. Moreover, in each of the plural armature configuration sections 82U to 82W, the one coupling portion 68 and crossing wire 76 and the other coupling portion 68 and crossing wire 76 may, for example, be provided on the same side of the axial center portions 83 of the respective armature configuration sections 82U to 82W.

Figure 27:
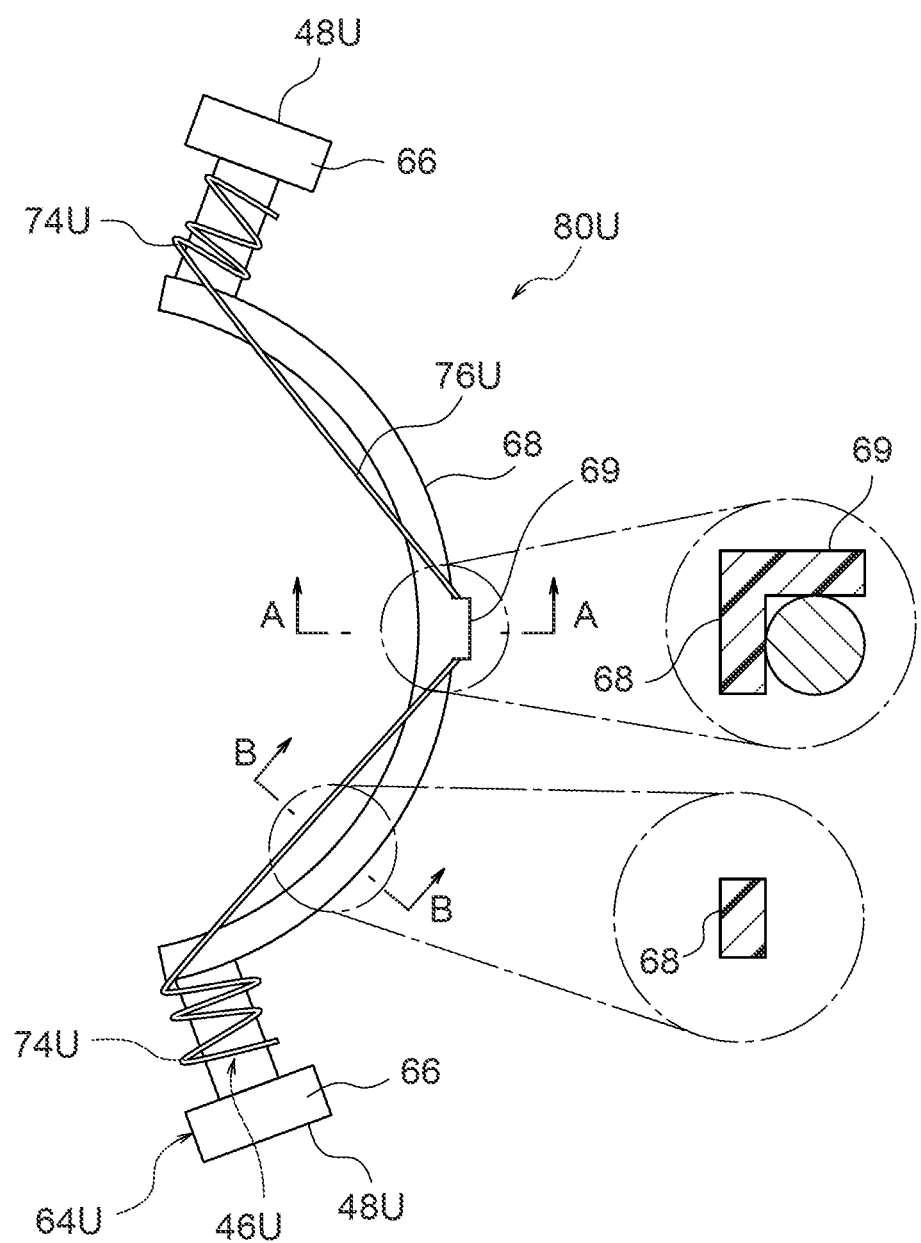
FIG. 27 is a plan view of an armature configuration unit according to a sixth modified example.

The crossing wires 76U to 76W' are respectively disposed following the circular arc shaped coupling portions 68, however the crossing wires 76U to 76W' do not have to be disposed following the coupling portions 68. Namely, for example as illustrated in FIG. 27, a hook portion 69 may be formed projecting toward the radial direction outside of the coupling portion 68 at a length direction central portion of the coupling portion 68, with a length direction central portion of the crossing wire 76U hooked over the hook portion 69. In such a configuration, the portions of the crossing wire 76U between the hook portion 69 and the wound portions 74U may extend in a straight line shape.

Figure 28:
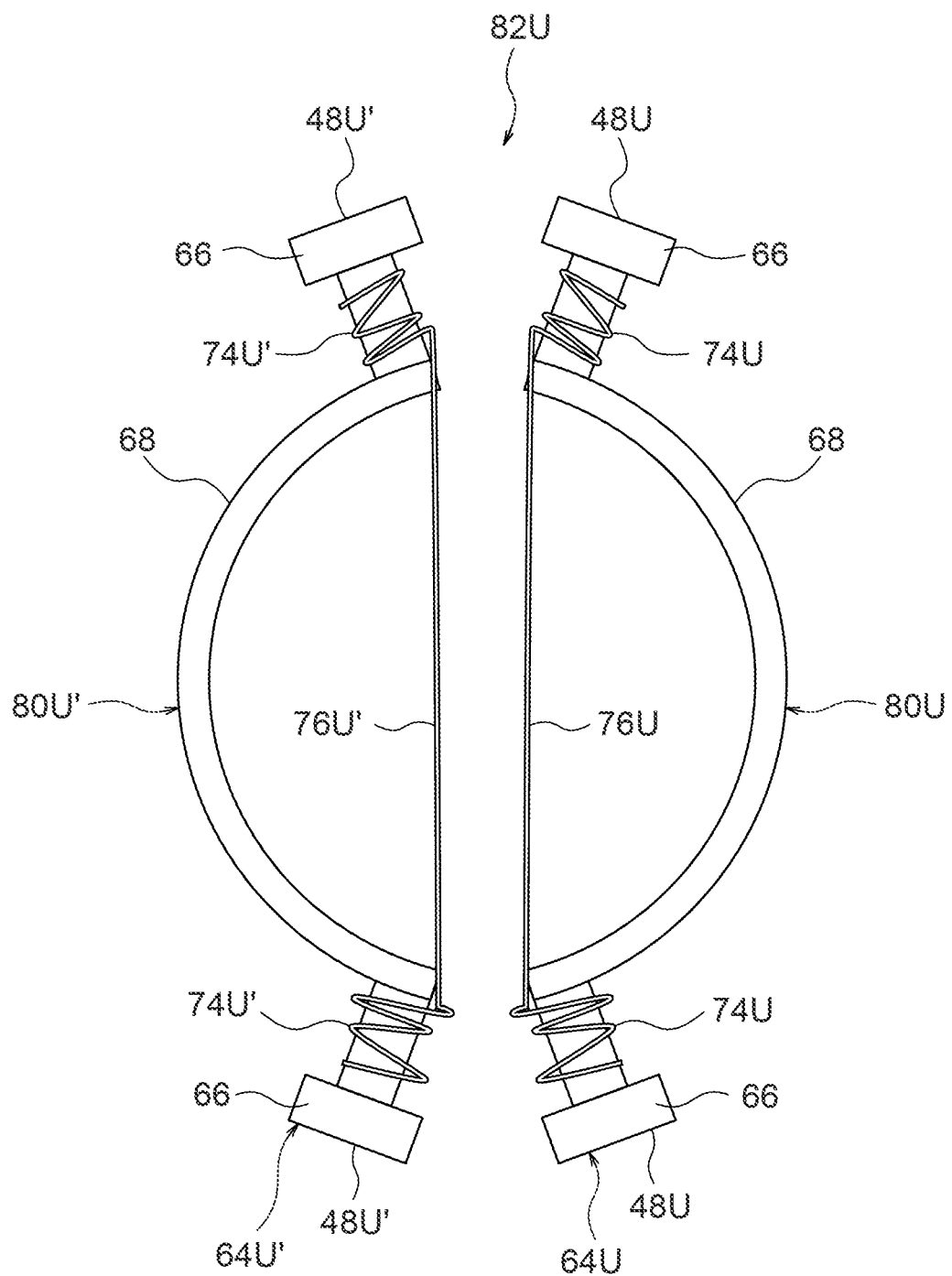
FIG. 28 is a plan view of a pair of armature configuration units according to a seventh modified example.

As illustrated in FIG. 28, the crossing wire 76U may extend in a straight line shape between one of the wound portions 74U and the other of the wound portions 74U without following the coupling portions 68. Similarly, the crossing wire 76U' may extend in a straight line shape between one of the wound portions 74U' and the other of the wound portions 74U' without following the coupling portions 68. Although not specifically illustrated, the other crossing wires 76V to 76W' do not have to follow the respective coupling portions 68, similarly to the crossing wires 76U, 76U' illustrated in FIG. 27 and FIG. 28.

The plural adjacent armature configuration units 80U to 80W' in the circumferential direction of the armature 10 are combined to configure the plural armature configuration sections 82U to 82W, however the plural armature configuration sections 82U to 82W need not be configured.

The core configuration members 48U to 48W' are integrated with the insulation portions 66 by mounting to the insulation portions 66, however the core configuration members 48U to 48W' may, for example, be integrated with the insulation portions 66 by integral molding.

The core configuration members 48U to 48W' may be configured as a layered core of layered core sheets, or may be configured as a powdered magnetic core formed from magnetic powder.

Out of the plural wound portions 74U to 74W', each of the armature configuration units 80U to 80W' includes a pair of the wound portions of the same phase as each other, however wound portions of different phases may be mixed in the plural armature configuration units configuring the armature 10.

The coil wires 46U to 46W' may employ rectangular wire instead of round wire.

Shaft portions of the tooth portions 50 may be formed in a tapered shape, increasing in width on progression along the radial direction of the armature 10.

Figure 29:
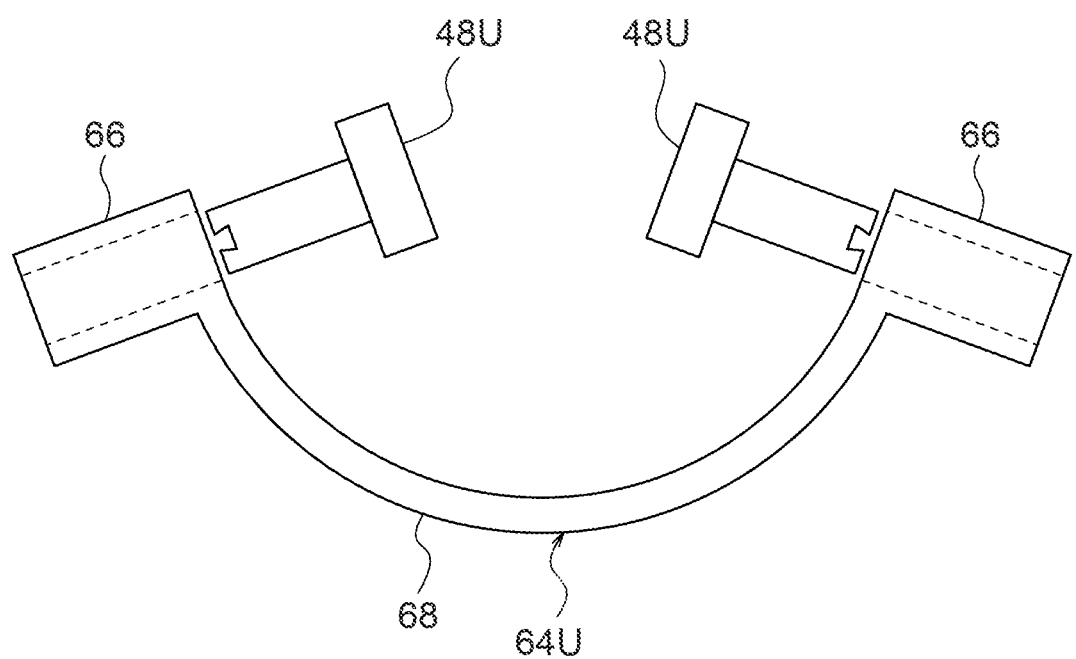
FIG. 29 is a plan view illustrating how core members are assembled to an insulation portion in an armature configuration unit according to an eighth modified example.

The core configuration members 48U may be inserted inside tube shaped insulation portions 66, as illustrated in FIG. 29. The other core configuration members 48U' to 48W' may also be inserted inside the insulation portions 66. The coil wires may be wound onto the periphery of the insulation portions 66 prior to inserting the core configuration members 48U to 48W' inside the insulation portions 66.

Figure 30:
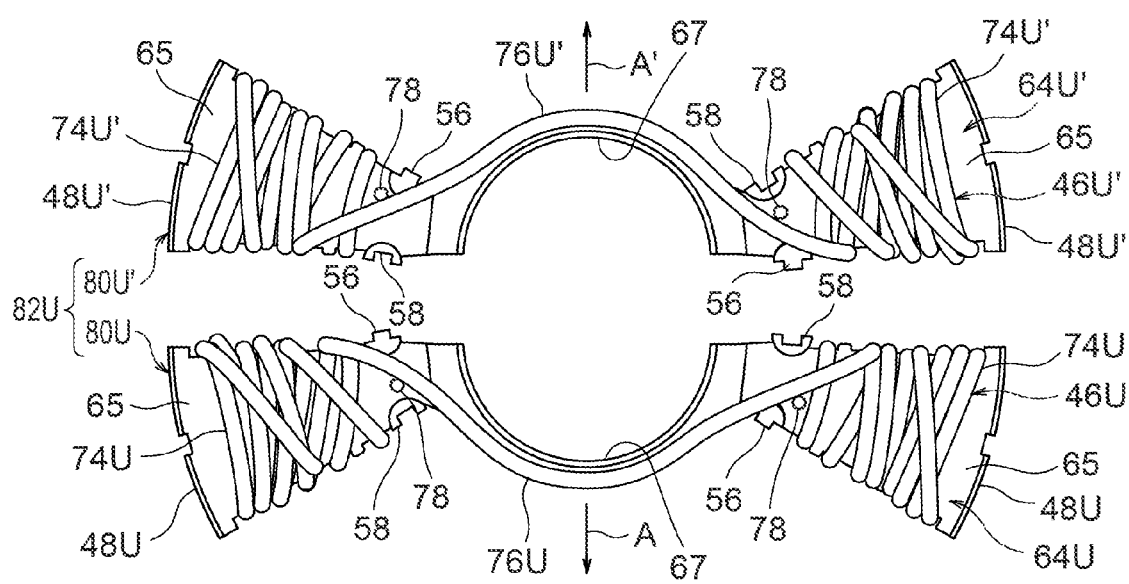
FIG. 30 is a plan view of a pair of armature configuration units according to a ninth modified example.

In the insulators 64U to 64W', the insulation portions 66 are integrally formed together with the coupling portions 68, however, as illustrated in FIG. 30, core insulation members 65, serving as insulation portions, and coupling members 67, serving as coupling portions, configured as separate bodies to one another, may be employed instead of the insulation portions 66 and the coupling portions 68. In such cases, the coupling members 67 may be formed from materials other than insulating materials. Configuring the coupling members 67 as separate bodies to the core insulation members 65 enables easier manufacture of the core insulation members 65, since the shape of the core insulation members 65 is less complex than when the coupling members 67 are integrally formed to the core insulation members 65.

The pair of insulators 64U, 64U' need not be symmetrical about a plane. Similarly, the pair of insulators 64V, 64V', and the pair of insulators 64W, 64W' need not be symmetrical about a plane.

The pairs of coupling portions 68 in each of the armature configuration sections 82U, 82V, and 82W need not be configured in ring shapes.

The coupling portions 68 need not be formed in circular arc shapes following the inner radial portions of the plural core configuration members 48U to 48W'.

In the above exemplary embodiment, the restriction portions 72 that extend out toward the radial direction outside of the coupling portions 68 from one end side (the arrow Z1 side) in the height direction of the guide portions 70 are formed spanning the entire length direction of the coupling portion 68. The crossing wires 76 are supported from the one axial direction side of the armature 10 (the arrow Z1 side) by the restriction portions 72. However, the restriction portions 72 may be of any shape, providing they have a shape capable of restricting movement of the crossing wires 76 in the axial direction of the armature 10.

The coil wires 46U to 46W' may be formed from a material other than copper, such as aluminum, for example. In each of the armature configuration units 80U to 80W' of the present exemplary embodiment, the pairs of core configuration members 48 are disposed so as to leave gaps equivalent to a length of four of the core configuration members in the circumferential direction of the coupling portion 68, thereby enabling the coil wires 46U to 46W' to be wound onto the respective core configuration members 48 intensively, even when aluminum wire, that generally has a larger wire diameter than copper wire, is employed in the coil wires 46U to 46W'. Cases in which aluminum wire is employed in the coil wires 46U to 46W' enable the quality of the armature 10 to be improved, since aluminum wire, that generally has lower rigidity than copper wire, can be wound onto the core configuration members 48 without applying excessive load.

Note that out of the plural modified examples described above, appropriate combinations of combinable modified examples may also be implemented.

Explanation has been given regarding an exemplary embodiment of the present invention, however there is no limitation of the present invention thereto, and it goes without saying that various other modifications may be implemented within a range not departing from the scope of the present invention.

What is claimed is:

1. An armature comprising:
 a plurality of core configuration members that configure an armature core and that are divided in a circumferential direction of the armature core;
 a plurality of insulators, each of which includes a pair of insulation portions integrated with the core configuration members, and a coupling portion that couples the pair of insulation portions together; and
 a plurality of coil wires, each of which includes a pair of wound portions that have been wound onto the respective core configuration members with the insulation portions interposed between the core configuration members and the wound portions, and a crossing wire that connects together the pair of wound portions, wherein:
 a plurality of armature configuration units are configured independently of each other, each of the armature configuration units comprising a pair of the core configuration members that lie on different sides of an axis of the armature from each other, connected by one of the plurality of insulators, wherein a respective coil wire is wound onto the pair of core configuration members,
 the plurality of armature configuration units configure a plurality of armature configuration sections, wherein each armature configuration section is configured by combining two of the armature configuration units that are adjacent in the circumferential direction,
 in each of the plurality of armature configuration sections, the coupling portion of the insulator and the crossing wire of one of the armature configuration units are arranged side by side with the coupling portion of the insulator and the crossing wire of another of the armature configuration units along a direction orthogonal to an axial direction of the armature configuration section, the crossing wire of the one of the armature configuration units and the crossing wire of the other of the armature configuration units being substantially in a same plane, and in each of the plurality of armature configuration sections, the crossing wire of the one of the armature configuration units does not intersect with the crossing wire of the other of the armature configuration units.

2. The armature of claim 1, wherein:
the coupling portion is formed from an insulating material, and
the insulation portion and the coupling portion are integrally formed.

3. The armature of claim 1, wherein:
in each of the plurality of armature configuration sections, the coupling portion and the crossing wire of one of the armature configuration units, and the coupling portion and the crossing wire of the other of the armature configuration units are provided separately on one side and the other side with respect to an axial center of the armature configuration section.

4. The armature of claim 3, wherein:
in each of the armature configuration sections, pairs of the insulators of two of the combined armature configuration units are disposed symmetrically about a plane.

5. The armature of claim 1, wherein:
in each of the armature configuration units, a pair of the core configuration members is disposed so as to leave a gap equivalent to a length of at least one core configuration member in the circumferential direction of the armature core between the respective core configuration members.

6. The armature of claim 1, wherein:
an engaging portion and an engaged portion are provided at each of the plurality of core configuration members, and
the plurality of core configuration members are coupled together in a ring shape by engagement of the adjacent engaging portions and engaged portions in the circumferential direction of the armature core.

7. The armature of claim 6, wherein:
a guide projection is provided to at a portion of the insulator connecting between the insulation portion and the coupling portion, and
an end portion of the crossing wire is positioned between the engaging portion and the engaged portion formed at both side portions of the core configuration member by being guided by the guide projection.

8. The armature of claim 7, wherein:
the crossing wires pass to an inner side of inner radial portions of the plurality of core configuration members.

9. The armature of claim 1, wherein:
in each of the armature configuration sections, a pair of the coupling portions of two of the combined armature configuration units forms a ring shape.

10. The armature of claim 1, wherein:
the coupling portions are formed in circular arc shapes along inner radial portions of the plurality of core configuration members.

11. The armature of claim 1, wherein each of the coupling portions includes:
a guide portion that supports the crossing wire from the radial direction inside of the coupling portion; and
a restriction portion that restricts movement of the crossing wire in an axial direction of the armature.

12. The armature of claim 1, wherein:
the plurality of armature configuration sections are assembled together along the axial direction of the armature configuration section;
the crossing wire in the armature configuration section of an intermediate layer is disposed between the coupling portions of the armature configuration sections of an upper layer and a lower layer of the plurality of armature configuration sections.

13. The armature of claim 1, wherein:
terminal end portions of the plurality of coil wires are disposed at a side opposite, in the axial direction of the plurality of armature configuration sections, to a coupling portion side.

14. A rotating electrical device comprising the armature of claim 1.

15. The armature of claim 1, wherein:
assuming that a number of the plurality of core configuration members is n, in each of the plurality of armature configuration units, one of the core configuration members is disposed with respect to the other of the core configuration members at a mechanical angle in a range of $(360°/n) \times 2$ or greater and less than $180°$, and
in the armature configuration units that configure the same phase out of the plurality of armature configuration units, the coupling portion and the crossing wire of one of the armature configuration units are arranged side by side with the coupling portion and the crossing wire of the other of the armature configuration units along a direction orthogonal to an axial direction of the plurality of armature configuration units.

16. An armature comprising:
a plurality of core configuration members that configure an armature core and that are divided in a circumferential direction of the armature core;
a plurality of insulators, each of which includes a pair of insulation portions integrated with the core configuration members, and a coupling portion that couples the pair of insulation portions together; and
a plurality of coil wires, each of which includes a pair of wound portions that have been wound onto the respective core configuration members with the insulation portions interposed between the core configuration members and the wound portions, and a crossing wire that connects together the pair of wound portions, wherein:
a plurality of armature configuration units are configured independently of each other by integrating a pair of the core configuration members with each of the plurality of insulators and winding the respective coil wire onto the pair of core configuration members,
the plurality of armature configuration units configure a plurality of armature configuration sections by combining two of the armature configuration units that are adjacent in the circumferential direction,
in each of the plurality of armature configuration sections, the coupling portion of the insulator and the crossing wire of one of the armature configuration units are arranged side by side with the coupling portion of the insulator and the crossing wire of another of the armature configuration units along a direction orthogonal to an axial direction of the armature configuration section, and
the coupling portions of at least the armature configuration section disposed in the lowermost layer are disposed at the inside of the plurality of wound portions arrayed in a ring shape, and within a height of the plurality of wound portions in the axial direction of the armature.

17. An armature comprising:
twelve core configuration members that configure an armature core and that are divided in a circumferential direction of the armature core;
six insulators, each of which includes a pair of insulation portions integrated with the core configuration members, and a coupling portion that couples the pair of insulation portions together; and
a plurality of coil wires, each of which includes a pair of wound portions that have been wound onto the respective core configuration members with the insulation portions interposed between the core configuration members and the wound portions, and a crossing wire that connects together the pair of wound portions, wherein:
the plurality of coil wires configure a U phase, a V phase and a W phase,
six of the armature configuration units are configured independently of each other by integrating a pair of the core configuration members with each of the six insulators and winding the respective coil wire onto the pair of core configuration members,
the six armature configuration units configure three of the armature configuration sections by combining two of the respective armature configuration units adjacent in the circumferential direction of the armature core, and
in each of the three armature configuration sections, the coupling portion of the insulator and the crossing wire of one of the armature configuration units are arranged side by side with the coupling portion of the insulator and the crossing wire of another of the armature configuration units along a direction orthogonal to an axial direction of the armature configuration section.

18. A method of manufacturing an armature the armature including a plurality of core configuration members that configure an armature core and that are divided in a circumferential direction of the armature core, the armature including a plurality of insulators, each of which includes a pair of insulation portions integrated with the core configuration members and a coupling portion that couples the pair of insulation portions together, and the armature including a plurality of coil wires, each of which includes a pair of wound portions that have been wound onto the respective core configuration members with the insulation portions interposed between the core configuration members and the wound portions, and a crossing wire that connects together the pair of wound portions, wherein a plurality of armature configuration units are configured independently of each other, each of the armature configuration units comprising a pair of the core configuration members that lie on different sides of an axis of the armature from each other, connected by one of the plurality of insulators, wherein a respective coil wire is wound onto the pair of core configuration members, wherein the plurality of armature configuration units configure a plurality of armature configuration sections, wherein each armature configuration section is configured by combining two of the armature configuration units that are adjacent in the circumferential direction, wherein in each of the plurality of armature configuration sections, the coupling portion of the insulator and the crossing wire of one of the armature configuration units are arranged side by side with the coupling portion of the insulator and the crossing wire of another of the armature configuration units along a direction orthogonal to an axial direction of the armature configuration section, the crossing wire of the one of the armature configuration units and the crossing wire of the other of the armature configuration units being substantially in a same plane, and wherein in each of the plurality of armature configuration sections, the crossing wire of the one of the armature configuration units does not intersect with the crossing wire of the other of the armature configuration units, the method of manufacturing the armature comprising:
an armature configuration unit assembly process in which the mutually independent plurality of armature configuration units are each assembled by integrating a pair of the core configuration members with each of the plurality of insulators, and winding the respective coil wire onto the pair of core configuration members;
an armature configuration section assembly process in which two adjacent armature configuration units in the circumferential direction of the armature core out of the plurality of armature configuration units are combined to assemble the plurality of armature configuration sections; and
an armature assembly process in which the plurality of armature configuration sections are assembled together to form the armature.

19. The method of claim 18, wherein:
in the armature configuration unit assembly process, a molded member is employed that integrally includes a pair of the insulators adjacent in the circumferential direction of the armature core out of the plurality of insulators, and a connector portion that connects the pair of insulators;
the pair of core configuration members are integrated with the insulators, and the respective coil wire is wound onto the pair of core configuration members, in a connected state of the pair of insulators by the connector portion; and
in the armature configuration section assembly process, the armature configuration units adjacent to each other in the circumferential direction of the armature core are combined in a state in which the connector portion has been removed.

20. A method of manufacturing an armature the armature including a plurality of core configuration members that configure an armature core and that are divided in a circumferential direction of the armature core, the armature including a plurality of insulators, each of which includes a pair of insulation portions integrated with the core configuration members and a coupling portion that couples the pair of insulation portions together, and the armature including a plurality of coil wires, each of which includes a pair of wound portions that have been wound onto the respective core configuration members with the insulation portions interposed between the core configuration members and the wound portions, and a crossing wire that connects together the pair of wound portions, wherein a plurality of armature configuration units are configured independently of each other, each of the armature configuration units comprising a pair of the core configuration members that lie on different sides of an axis of the armature from each other, connected by one of the plurality of insulators, wherein a respective coil wire is wound onto the pair of core configuration members, wherein the plurality of armature configuration units configure a plurality of armature configuration sections, wherein each armature configuration section is configured by combining two of the armature configuration units that are adjacent in the circumferential direction, wherein in each of the plurality of armature configuration sections, the coupling portion of the insulator and the crossing wire of one of the armature configuration units are arranged side by side with the coupling portion of the insulator and the crossing wire of another of the armature configuration units along a direction orthogonal to an axial direction of the armature configuration section, the crossing wire of the one of the armature configuration units and the crossing wire of the other of the armature configuration units being substantially in a same plane, and wherein in each of the plurality of armature configuration sections, the crossing wire of the one of the armature configuration units does not intersect with the crossing wire of the other of the armature configuration units, wherein assuming that a number of the plurality of core configuration members is n, in each of the plurality of armature configuration units, one of the core configuration members is disposed with respect to the other of the core configuration members at a mechanical angle in a range of $(360°/n) \times 2$ or greater and less than $180°$, and in the armature configuration units that configure the same phase out of the plurality of armature configuration units, the coupling portion and the crossing wire of one of the armature configuration units are arranged side by side with the coupling portion and the crossing wire of the other of the armature configuration units along a direction orthogonal to an axial direction of the plurality of armature configuration units, the method of manufacturing the armature comprising:

an armature configuration unit assembly process in which the mutually independent plurality of armature configuration units are each assembled by integrating a pair of the core configuration members with each of the plurality of insulators, and winding the respective coil wire onto the pair of core configuration members; and an armature assembly process in which the plurality of armature configuration units are assembled together to form the armature, and wherein:

in the armature configuration unit assembly process, a molded member is employed that integrally includes the plurality of insulators and a connector portion that connects the plurality of respective insulators, and the core configuration members are integrated with the insulators, and the respective coil wire is wound onto the core configuration members, in a connected state of the plurality of insulators by the connector portion, and the connector portion is removed between the armature configuration unit assembly process and the armature assembly process.

* * * * *